(12) United States Patent
Kaida

(10) Patent No.: US 11,375,132 B2
(45) Date of Patent: Jun. 28, 2022

(54) IMAGING APPARATUS, METHOD OF CONTROLLING THE IMAGING APPARATUS, AND PROGRAM

(71) Applicant: CANON KABUSHIKI KAISHA, Tokyo (JP)

(72) Inventor: Hironori Kaida, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 146 days.

(21) Appl. No.: 16/850,836

(22) Filed: Apr. 16, 2020

(65) Prior Publication Data

US 2020/0244863 A1  Jul. 30, 2020

Related U.S. Application Data

(63) Continuation of application No. PCT/JP2018/039130, filed on Oct. 22, 2018.

(30) Foreign Application Priority Data

Oct. 27, 2017 (JP) .............................. JP2017-208369
Oct. 5, 2018 (JP) .............................. JP2018-189988

(51) Int. Cl.
*H04N 5/235* (2006.01)
*H04N 5/247* (2006.01)
*H04M 1/02* (2006.01)

(52) U.S. Cl.
CPC ........ *H04N 5/2353* (2013.01); *H04M 1/0264* (2013.01); *H04N 5/247* (2013.01); *H04M 2250/52* (2013.01)

(58) Field of Classification Search
CPC .. H04N 5/2353; H04N 5/247; H04N 5/23254; H04N 5/2258; H04N 5/23218; H04N 5/23251–23277; H04N 5/2327; H04M 1/0264; H04M 2250/52
See application file for complete search history.

(56) References Cited

U.S. PATENT DOCUMENTS

| | | | | |
|---|---|---|---|---|
| 2004/0130628 A1* | 7/2004 | Stavely | .............. | H04N 5/23248 348/208.4 |
| 2011/0149106 A1* | 6/2011 | Kino | .................... | H04N 1/3876 348/222.1 |
| 2012/0250945 A1* | 10/2012 | Peng | ...................... | G06T 7/223 382/107 |
| 2016/0269636 A1* | 9/2016 | Kuchiki | ................... | G06T 7/90 |
| 2017/0111568 A1* | 4/2017 | Hsieh | ................... | H04N 5/2252 |
| 2018/0278822 A1* | 9/2018 | Takahashi | ............. | H04N 5/243 |
| 2020/0007733 A1* | 1/2020 | Shimizu | ............... | H04N 5/2327 |
| 2020/0244886 A1* | 7/2020 | Sasaki | ................. | H04N 5/2353 |

FOREIGN PATENT DOCUMENTS

| | | |
|---|---|---|
| JP | 2002-40506 A | 2/2002 |
| JP | 2006-197192 A | 7/2006 |
| JP | 2009-77272 A | 4/2009 |
| WO | 2017/090458 A1 | 6/2017 |

\* cited by examiner

*Primary Examiner* — Jason A Flohre
(74) *Attorney, Agent, or Firm* — Canon U.S.A., Inc. IP Division

(57) ABSTRACT

The imaging apparatus of the present invention determines the cumulative amount of motion amounts of the object between frames of multiple pieces of image data, which are captured by a second imaging device, and starts the exposure for the image data for a first frame by the first imaging device in accordance with a result of comparison between the cumulative amount and a first threshold value.

18 Claims, 16 Drawing Sheets

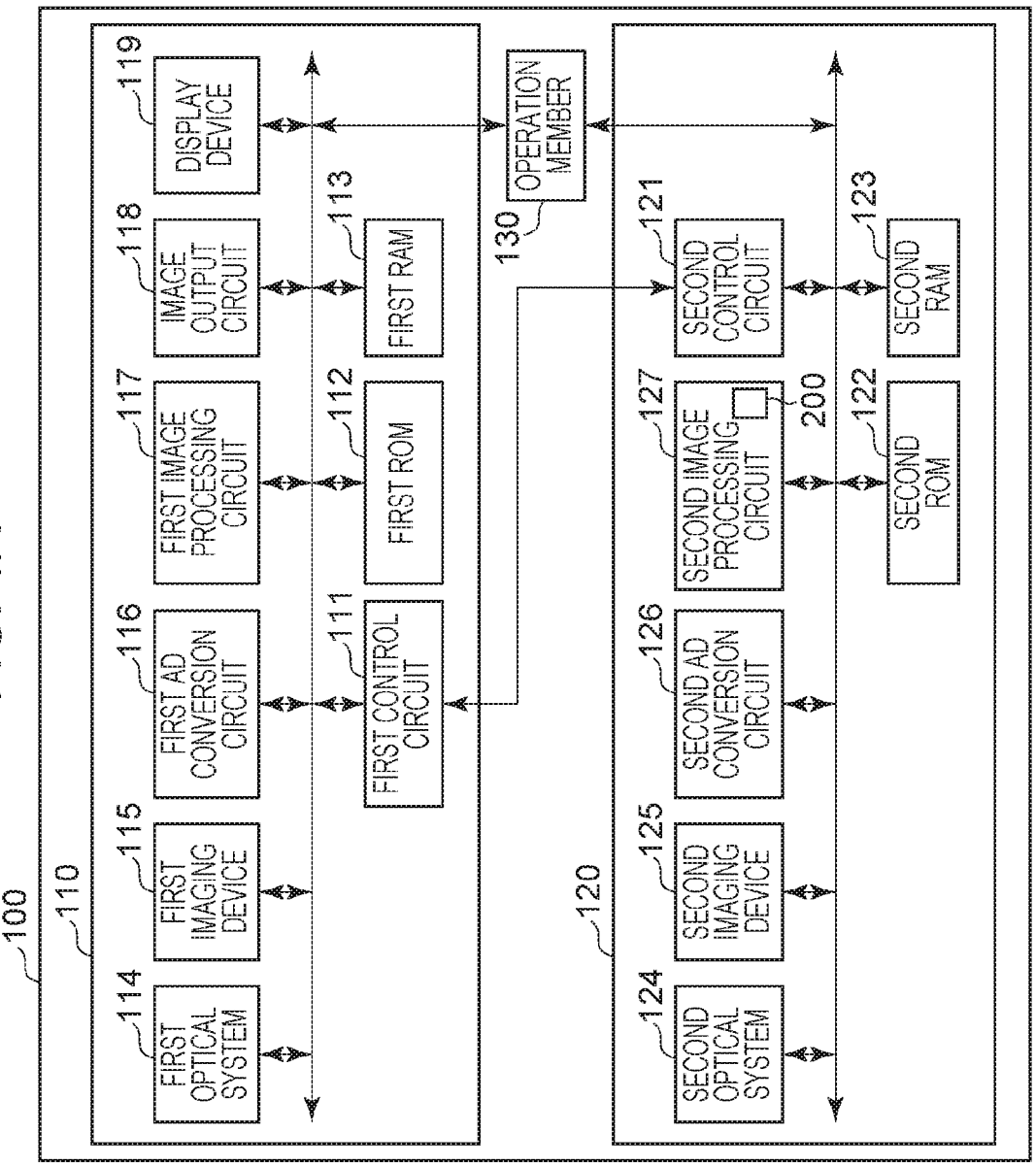

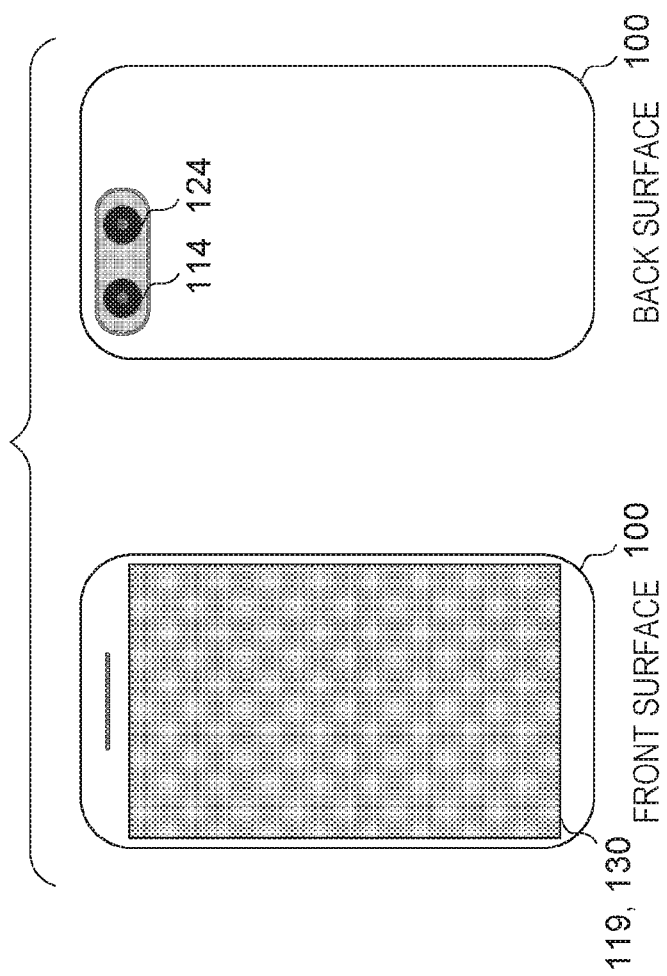

FIG. 12

|  | FIRST IMAGING DEVICE 115 | SECOND IMAGING DEVICE 125 |
|---|---|---|
| IMAGING UNIT HORIZONTAL SIZE [mm] | 36 | 4 |
| NUMBER OF HORIZONTAL PIXELS [pix] | 6400 | 640 |
| PIXEL PITCH [μm] | 5.62 | 6.25 |
| FRAME RATE [fps] | 20 | 1000 |

IMAGING APPARATUS, METHOD OF CONTROLLING THE IMAGING APPARATUS, AND PROGRAM

CROSS-REFERENCE TO RELATED APPLICATIONS

This application is a Continuation of International Patent Application No. PCT/JP2018/039130, filed Oct. 22, 2018, which claims the benefit of Japanese Patent Application No. 2017-208369, filed Oct. 27, 2017, and Japanese Patent Application No. 2018-189988, filed Oct. 5, 2018, both of which are hereby incorporated by reference herein in their entirety.

TECHNICAL FIELD

The present invention relates to a technology to capture an image in time with the motion of an object.

BACKGROUND ART

Imaging apparatuses, such as a camera mounted in a smartphone and a digital camera, having an image capturing mode in which priority is given to the shutter speed are known in recent years. In this image capturing mode, a photographer sets a desired shutter speed and the imaging apparatus automatically sets exposure setting values, such as an aperture and an International Organization for Standardization (ISO) sensitivity, other than the shutter speed. The photographer is capable of capturing an image at a desired shutter speed by using this image capturing mode. For example, setting the shutter speed having a short exposure time enables an image having little motion blur of an object to be captured even for a fast-moving object, such as sprays of a waterfall or a racing car. Japanese Patent Laid-Open No. 2006-197192 discloses an imaging apparatus that detects the motion amount of an object from an image that is captured before a still image is captured to determine the shutter speed based on the result of the detection.

In order to capture an image having little motion blur of the object, it is necessary to perform the image capturing at a high shutter speed having a short exposure time. However, the timing of the image capturing may be lost even when the high shutter speed is set before the image capturing to capture an image.

For example, when an image of an object that irregularly moves at a high speed is to be captured, for example, at a moment when an animal starts to move or at a moment when a bird takes off, there is a case in which the reaction to depress the shutter is too late and an image of the object in a desired start-of-motion state may not be captured. If the timing to start the image capturing is not appropriate even when a high shutter speed is set, it is not possible to perform the image capturing in which a desired motion of the object that irregularly moves at a high speed is captured.

SUMMARY OF INVENTION

According to an embodiment of the present invention, an imaging apparatus includes a first imaging device; a second imaging device; and at least one processor or circuit configured to perform the operations of following units: a determination unit configure to determine a cumulative amount of motion amounts of an object between frames of multiple pieces of image data, which are captured by the second imaging device; and a control unit configured to start exposure for the image data for a first frame by the first imaging device in accordance with a result of comparison between the cumulative amount and a first threshold value.

According to another embodiment of the present invention, an imaging apparatus removable from an external imaging apparatus including a first imaging device, includes a second imaging device; and at least one processor or circuit configured to perform the operations of following units: a determination unit configured to determine a cumulative amount of motion amounts of an object between frames of multiple pieces of image data, which are captured by the second imaging device; and a control unit configured to start exposure for the image data for a first frame by the first imaging device in accordance with a result of comparison between the cumulative amount and a first threshold value.

Further features of the present invention will become apparent from the following description of exemplary embodiments with reference to the attached drawings.

BRIEF DESCRIPTION OF DRAWINGS

FIG. 1A is a block diagram illustrating an example of the configuration of an imaging apparatus according to a first embodiment of the present invention.

FIG. 1B illustrates a smartphone, which is an example of the imaging apparatus according to the first embodiment of the present invention.

FIG. 12 is a table indicating the configurations of the first imaging device and the second imaging device.

DESCRIPTION OF EMBODIMENTS

Figure 2:
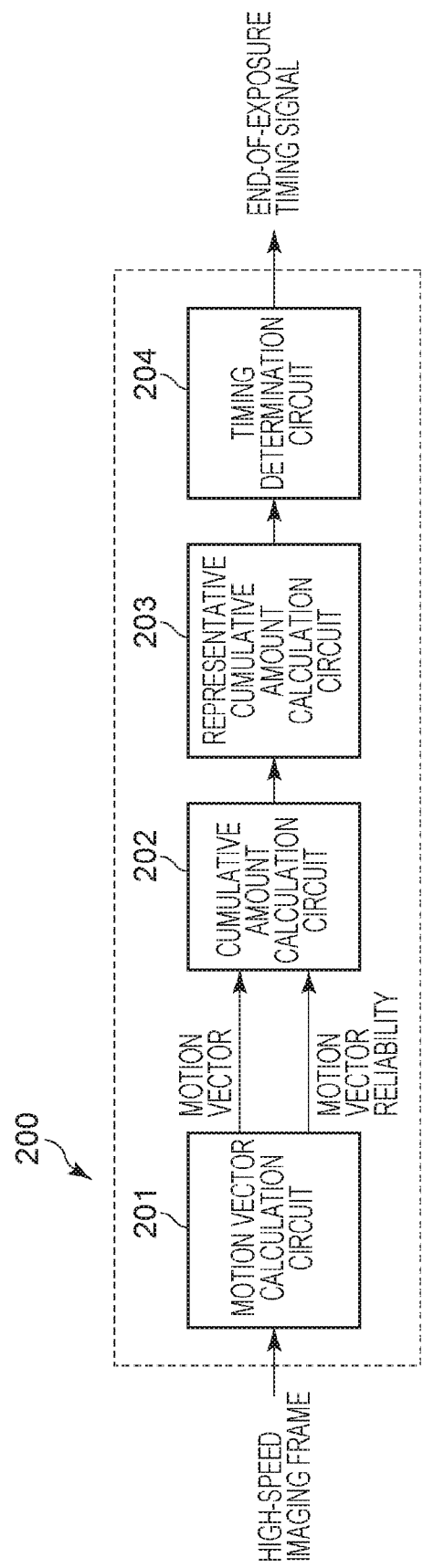
FIG. 2 is a block diagram illustrating an example of the configuration of a timing generation circuit according to the first embodiment of the present invention.

Embodiments of the present invention will herein be described in detail with reference to the drawings. Although a so-called digital camera is adopted as an imaging apparatus according to the embodiments of the present invention, the present invention is not limited to this. The present invention may be embodied as other apparatuses having an imaging function, for example, a digital video camera, a mobile phone, a smartphone, and another mobile electronic device.

First Embodiment

In a first embodiment of the present invention, an imaging apparatus will be described in which the timing to start exposure is determined based on the result of motion analysis using motion vectors during the exposure to capture an image in time with the motion of an object. The first embodiment of the present invention will now be described.

FIG. 1A is a block diagram illustrating an example of the configuration of an imaging apparatus 100 according to the first embodiment of the present invention. The imaging apparatus 100 is composed of a first imaging unit 110, a second imaging unit 120, and an operation member 130.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s). First, in the first imaging unit 110, a first control circuit 111 is a processor, such as a central processing unit (CPU) or a micro processing unit (MPU). The first control circuit 111 reads out an operation program of each block in the first imaging unit 110 from a first read only memory (ROM) 112 described below and decomposes the operation program in a first random access memory (RAM) 113 described below for execution to control the operation of each block in the first imaging unit 110. In addition, the first control circuit 111 manages and controls the entire operation of the first imaging unit 110 and the second imaging unit 120. The first ROM 112 is an electrically erasable and recordable non-volatile memory and stores parameters necessary to operate each block and so on, in addition to the operation program of each block in the first imaging unit 110. The first RAM 113 is a rewritable volatile memory and is used as a temporary storage area of data output in the operation of each block in the first imaging unit 110.

A first optical system 114 is composed of a lens group including a zoom lens and a focus lens and forms an image of the object on a first imaging device 115 described below. The first imaging device 115 is composed of, for example, a charge coupled device (CCD) sensor or a complementary metal oxide semiconductor (CMOS) sensor including color filters of multiple colors. The first imaging device 115 performs photoelectric conversion of an optical image formed on the first imaging device 115 by the first optical system 114 and supplies an analog image signal resulting from the photoelectric conversion to a first AD conversion circuit 116. The first imaging device 115 starts the exposure at the timing when a shutter button included in the operation member 130 is fully depressed and stops the exposure in response to a signal for instructing an end-of-exposure timing output from a timing generation circuit 200 described above. The first AD conversion circuit 116 converts the analog image signal that is input into a digital image signal and supplies the digital image data resulting from conversion to the first RAM 113.

A first image processing circuit 117 applies a variety of image processing, such as white balance adjustment, color interpolation, noise correction, gamma correction, conversion into luminance-color difference signals, and aberration correction, to the image data stored in the first RAM 113. An image output circuit 118 receives the image data processed in the first image processing circuit 117 via the first RAM 113 and transmits the received image data to an external apparatus. Specifically, the image output circuit 118 reads or writes the image data from or to a recording medium removable from the imaging apparatus 100 and transmits and receives an image to and from a smartphone, a server, or the like using a wireless or wired communication function. A display device 119 is, for example, a liquid crystal display (LCD) or an organic electroluminescent (EL) display and displays an image recorded in the first RAM 113.

Next, in the second imaging unit 120, a second control circuit 121 is a processor, such as a CPU or an MPU. The second control circuit 121 reads out an operation program of each block in the second imaging unit 120 from a second ROM 122 described below and decomposes the operation program in a second RAM 123 described below for execution to control the operation of each block in the second imaging unit 120. The second ROM 122 is an electrically erasable and recordable non-volatile memory and stores parameters necessary to operate each block and so on, in addition to the operation program of each block in the second imaging unit 120. The second RAM 123 is a rewritable volatile memory and is used as a temporary storage area of data output in the operation of each block in the second imaging unit 120.

A second optical system 124 is composed of a lens group including a zoom lens and a focus lens and forms an image of the object on a second imaging device 125 described below. The second imaging device 125 is an imaging device, such as a CCD sensor or a CMOS sensor. The second imaging device 125 performs the photoelectric conversion of an optical image formed on the second imaging device 125 by the second optical system 124 and supplies an analog image signal resulting from the photoelectric conversion to a second AD conversion circuit 126. Since the second imaging device 125 is a device used to detect a motion or motion blur, the second imaging device 125 may not necessarily include color filters of multiple colors. The second imaging device 125 may have a configuration including a single-color (white) filter or an infrared filter. The second AD conversion circuit 126 converts the analog image signal that is input into a digital image signal and supplies the digital image data resulting from conversion to the second RAM 123.

A second image processing circuit 127 applies a variety of image processing, such as simple noise correction and gamma correction, to the image data stored in the second RAM 123. When the second imaging device 125 includes the color filters of multiple colors, the second image processing circuit 127 also performs the color interpolation or conversion into a luminance signal. In addition, the second image processing circuit 127 includes the timing generation circuit 200, which generates the signal for instructing the end-of-exposure timing of the first imaging device 115 based on the result of the motion analysis using the image data stored in the second RAM 123. The signal for instructing the end-of-exposure timing is supplied to the first imaging unit 110 via the second control circuit 121. In the first imaging unit 110, upon reception of this signal, the first control circuit 111 controls the first imaging device 115 so as to stop the exposure.

The operation member 130 accepts an instruction from a user and includes the shutter button and dial keys. The display device 119 may have a touch panel function. Signals generated by the user who operates these operation members are reflected in driving control of the first imaging unit 110 and the second imaging unit 120.

Although the example is described here in which the first imaging unit 110 and the second imaging unit 120 are integrally configured as the imaging apparatus 100, the configuration is not limited to this. For example, the first imaging unit 110 and the operation member 130 may be the main body of a camera and the second imaging unit 120 may be an imaging apparatus removable from the main body of the camera. In other words, the second imaging unit 120 may be an imaging apparatus removable from an external imaging apparatus. If the first imaging unit 110 is a single-lens reflex camera, an interchangeable lens including the first optical system 114 is removal from the main body of the camera including the first imaging device 115 to the display device 119 and the operation member 130. FIG. 1B illustrates a smartphone (or a tablet terminal), which is an example of the imaging apparatus 100. A touch panel also functioning as the display device 119 and the operation member 130 is provided on the front surface of the smartphone, and the first optical system 114 in the first imaging unit 110 and the second optical system 124 in the second imaging unit 120 are arranged on the back surface of the smartphone. The present invention is capable of being embodied in such a smartphone.

When the first control circuit 111 also functions as the second control circuit 121, the second control circuit 121 may be omitted. In addition, the second imaging unit 120 may only include the second optical system 124, the second imaging device 125, the second AD conversion circuit 126, and the second RAM 123 and the first imaging unit 110 may function as the remaining components in the second imaging unit 120. In this case, when the second imaging unit 120 is another camera, the configuration of the camera is capable of being simplified.

The first imaging device 115 is intended to generate an image for recording while the second imaging device 125 is intended to detect the motion of an object that rapidly moves. Accordingly, the frame rate required for the first imaging device 115 is different form that for the second imaging device 125. FIG. 12 is a table resulting from comparison between the configuration of the first imaging device 115 and that of the second imaging device 125 in the first embodiment. It is assumed in the first embodiment that the frame rate of the first imaging device 115 is 20 frames per second (fps) while the frame rate of the second imaging device 125 is 1,000 fps.

Accordingly, the second imaging device 125 is capable of setting the shutter speed having an exposure time shorter than that of the first imaging device 115. In order to realize this shutter speed, it is necessary to increase the sensitivity in the second imaging device 125, compared with that in the first imaging device 115. Consequently, the second imaging device 125 is configured so as to have a smaller number of pixels and to have a larger pitch, compared with those in the first imaging device 115. Specifically, as illustrated in FIG. 12, the horizontal size of the imaging unit is 36 mm in the first imaging device 115 while the horizontal size of the imaging unit is 4 mm in the second imaging device 125. The number of horizontal pixels is 6,400 in the first imaging device 115 while the number of horizontal pixels is 640 in the second imaging device 125. The pixel pitch is 5.62 µm in the first imaging device 115 while the pixel pitch is 6.25 µm in the second imaging device 125.

The configuration of the timing generation circuit 200 provided in the second image processing circuit 127 in the second imaging unit 120 will now be described with reference to FIG. 2. The timing generation circuit 200 detects the motion vectors in the image data that is acquired by the second imaging device 125 at a high frame rate and that is stored in the second RAM 123 to analyze the motion. It is assumed that, if the second imaging device 125 includes the color filters of multiple colors, the image data has been subjected to the color interpolation and the conversion into a luminance signal and each pixel has the signal of the same components. The end-of-exposure timing of the first imaging device 115 is determined based on the result of the analysis of the motion and a signal for stopping the exposure of the first imaging device 115 is supplied to the first imaging unit 110.

FIG. 2 is a block diagram illustrating an example of the configuration of the timing generation circuit 200 according to the first embodiment. Referring to FIG. 2, the timing generation circuit 200 includes a motion vector calculation circuit 201, a cumulative amount calculation circuit 202, a representative cumulative amount calculation circuit 203, and a timing determination circuit 204.

Figure 3:
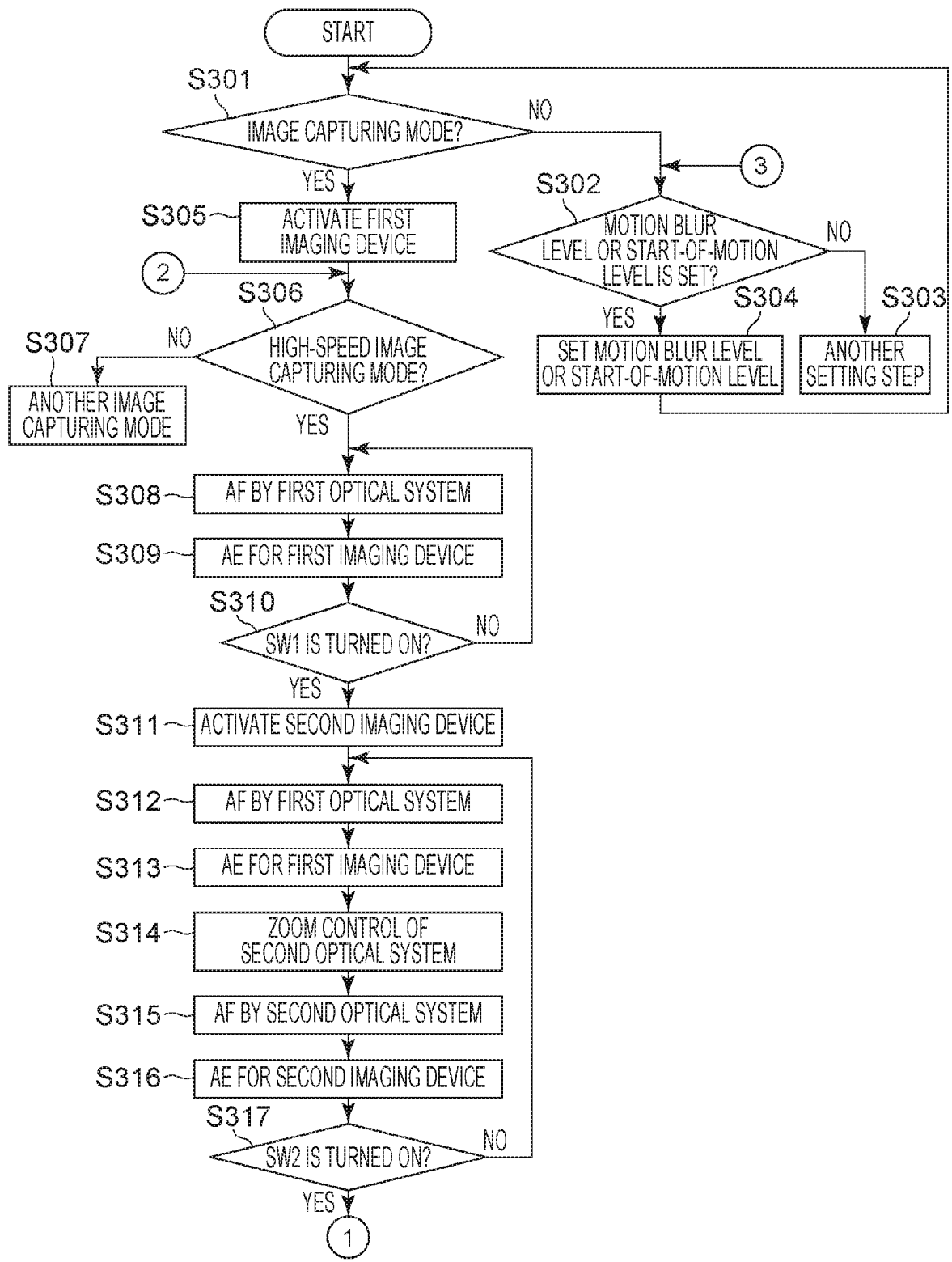
FIG. 3 is a flowchart of an imaging process in a high-speed image capturing mode in the first embodiment of the present invention.
Figure 4:
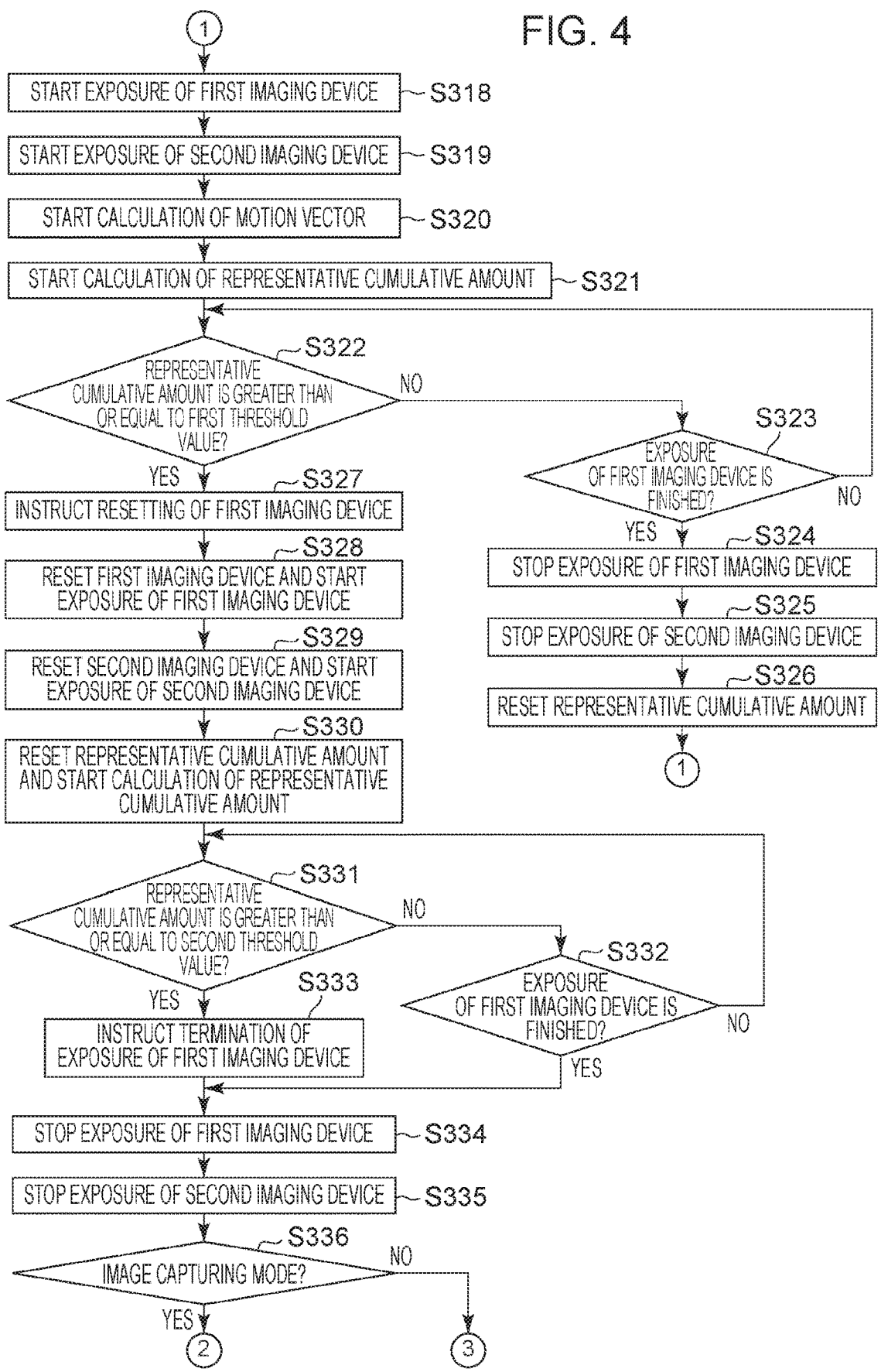
FIG. 4 is a flowchart of the imaging process in the high-speed image capturing mode in the first embodiment of the present invention.

An imaging process in a high-speed image capturing mode in the imaging apparatus 100 of the first embodiment of the present invention will now be described with reference to FIG. 3 and FIG. 4. FIG. 3 and FIG. 4 are flowcharts of the imaging process in the high-speed image capturing mode in the first embodiment. The flowchart illustrated in FIG. 3 is started upon turning on of the imaging apparatus 100.

Referring to FIG. 3, in Step S301, the first control circuit 111 determines whether the image capturing mode is set. If the image capturing mode is not set (NO in Step S301), the process goes to Step S302. If the image capturing mode is set (YES in Step S301), the process goes to Step S305.

In Step S302, the first control circuit 111 determines whether a setting menu of a motion blur level or a start-of-motion level is selected. If another setting process is selected (NO in Step S302), the process goes to Step S303. In Step S303, the first control circuit 111 performs the other setting process. If the setting menu of the motion blur level or the start-of-motion level is selected (YES in Step S302), the process goes to Step S304.

In Step S304, the first control circuit 111 displays a screen to set the motion blur level or the start-of-motion level in the display device 119 and sets either of the levels in accordance with the result of an operation by the user with the operation member 130. For example, the graded motion blur levels from "Standard" to "Low" are displayed in the display device 119 and the user is capable of selecting any of the motion blur levels. A second threshold value described below is set so that the motion blur included in an image that is captured is decreased as the user selects the motion blur level closer to "Low". Also for the start-of-motion level, the graded start-of-motion levels are displayed in the display device 119 and the user is capable of selecting any of the start-of-motion levels. Since the criteria for determination of whether the object started to move partially depends on the impression held by the user, the start-of-motion levels are indicated by numerical values and the user is capable of selecting any of the start-of-motion levels within a wide range.

Upon selection of start-of-motion level, the first control circuit 111 determines the determination value of a motion amount in the first imaging unit 110 and the second control circuit 121 sets a first threshold value used in Step S322 described below based on the determination value of the motion amount. Upon selection of the motion blur level, the first control circuit 111 determines a permitted motion blur value in the first imaging unit 110 and the second control circuit 121 sets the second threshold value used in Step S331 described below based on the permitted motion blur value.

A case is described here as an example, in which the user sets the motion blur level so as to be lower than the start-of-motion level and the user selects the motion blur level "Low" in which the motion blur is minimized.

When the motion blur level is "Low", it is assumed that the permitted motion blur value is set to a permitted circle-of-confusion diameter. Here, the permitted circle-of-confusion diameter indicates a limit value at which an observer having a visual acuity of 1.0 is capable of resolving an image when a photo is observed at a distance of distinct vision of 250 mm and is equal to about 20 µm on the imaging device of 36 mm×24 mm. A pitch 22.48 µm (5.62×4) corresponding to four pixels of the first imaging device 115 is set as the permitted circle-of-confusion diameter in the first embodiment of the present invention. Upon completion of setting of the motion blur level and the second threshold value, the process goes back to Step S301.

In Step S305, the first control circuit 111 activates the first imaging device 115.

In Step S306, the first control circuit 111 determines whether the high-speed image capturing mode is set as the image capturing mode. If the high-speed image capturing mode is not set (NO in Step S306), the process goes to Step S307. In Step S307, the first control circuit 111 performs the processing in another image capturing mode. If the high-speed image capturing mode is set (YES in Step S306), the process goes to Step S308.

In Step S308, the first control circuit 111 drives the first optical system 114 based on a contrast value of the object acquired from the first imaging device 115 or an output from a ranging sensor (not illustrated) to perform automatic focus control (AF).

In Step S309, the first control circuit 111 performs automatic exposure control (AE) for the first imaging device 115 based on a luminance value of the object acquired from the first imaging device 115.

In Step S310, the first control circuit 111 determines whether a switch SW1 in a shutter switch included in the operation member 130 is turned on in response to half-depression of the shutter switch. The process repeats Step S308 and Step S309 until the switch SW1 is turned on.

If the first control circuit 111 determines in Step S310 that the switch SW1 is turned on (YES in Step S310), in Step S311, the second control circuit 121 activates the second imaging device 125.

In Step S312, the first control circuit 111 performs the AF using the first optical system 114 for a main object that is selected when the switch SW1 is turned on.

In Step S313, the first control circuit 111 performs the AE for the first imaging device 115 for the main object that is selected when the switch SW1 is turned on.

In Step S314, the second control circuit 121 receives zoom information about the first optical system 114 from the first control circuit 111 to control the zoom state of the second optical system 124. Control of the zoom state of the second optical system 124 will now be described with reference to FIG. 5.

Figure 5:
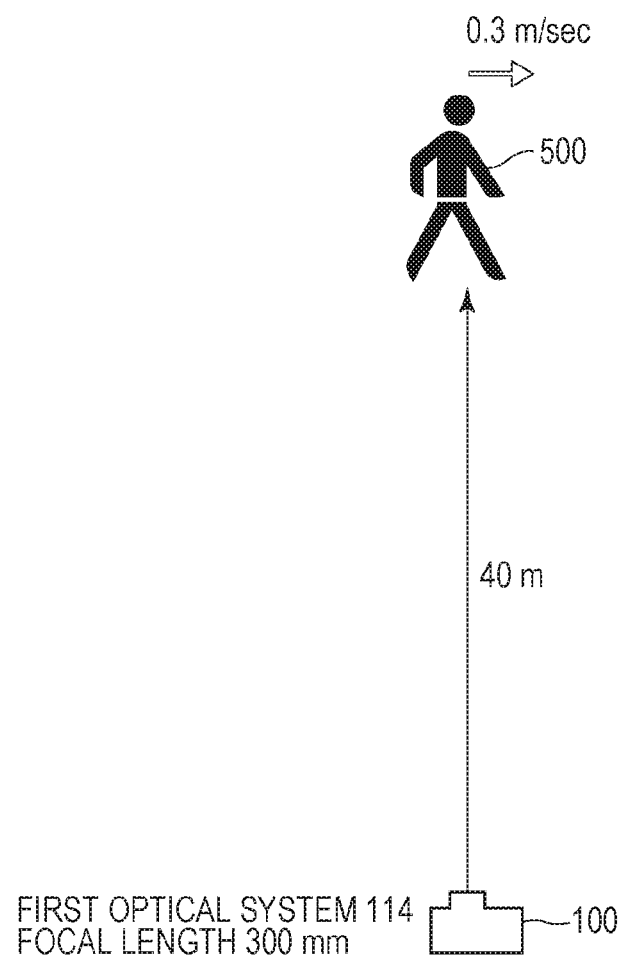
FIG. 5 is a diagram for describing the positional relationship between the imaging apparatus and an object.

FIG. 5 is a diagram for describing the positional relationship between the imaging apparatus 100 and an object 500 when the switch SW1 is turned on. Referring to FIG. 5, the first optical system 114 in the imaging apparatus 100 has a focal length of 300 mm and is going to capture an image of the object 500, who moves at 0.3 m/sec (300 mm/sec) 40 m ahead of the imaging apparatus 100. It is assumed that the object 500 is moving near the optical axis of the first optical system 114. In the following description, a plane 40 mm ahead of the imaging apparatus 100 is called an object surface. The moving speed of the object 500 is capable of being measured by calculating the motion vectors described below from information about the distance to the object 500 and an image acquired during framing.

Since the image magnification of the first optical system 114 in the first embodiment is calculated by dividing the distance to the object by the focal length, the image magnification of the first optical system 114 in the first embodiment is equal to 40×1,000/300=133.3.

The field angle of the object on the object surface captured by the entire first imaging device 115 is equal to 133.3× 5.62×6,400/1,000=4,795.7 mm.

It is assumed here that, before the switch SW1 is turned on, the field angle of the image captured by the first imaging unit 110 is the same as that of the image captured by the second imaging unit 120. At this time, the image magnification of the second optical system 124 is equal to 4,795.7× 1,000/6.25/640=1,198,9 and the focal length is equal to 40×1,000/1,198.9=33.3. In addition, the size of the object on the object surface per unit pixel in the second imaging device 125 is equal to 1,198.9×6.25/1,000=7.5 mm. The value resulting from multiplication of this value by resolution in the calculation of the motion vectors described below is the resolution of the motion which the second imaging device 125 is capable of capturing. When the resolution in the calculation of the motion vectors is 0.5 pixels, the resolution of the motion is equal to 7.5×0.5=3.75 mm.

In contrast, the size of the object on the object surface per unit pixel in the first imaging device 115 is equal to 133.3×5.62/1,000=0.75 mm and the permitted motion blur value is four pixels, that is, 0.75×4=3.0 mm. Accordingly, since the permitted motion blur value is lower than the resolution of the motion of the second imaging device 125 in this state, it is not possible to determine whether the motion blur of the first imaging device 115 is lower than or equal to the permitted value even with the second imaging device 125.

In order to resolve this problem, the second control circuit 121 moves the focal length of the second optical system 124 to the telephoto side for zooming to increase the resolution of motion detection in the second imaging device 125.

The time required for the object 500, who moves at 300 mm/sec, to reach the permitted motion blur value 3.0 mm is equal to 3.0/300×1,000=10.0 msec.

Accordingly, the resolution of the motion required per unit frame (one msec) in the second imaging unit 120 is equal to 3.0/10.0/0.5=0.6 mm.

Consequently, if the second control circuit 121 changes the image magnification of the second optical system 124 to 0.6×1,000/6.25=96.0 and the focal length to 40×1,000/96.0=416.6 mm, the resolution of the motion is made lower than the permitted motion blur value. This enables the end-of-exposure timing of the first imaging device 115 to be controlled based on the result of the motion detection using the image data acquired by the second imaging device 125 to capture an image of the object 500 with the motion blur not greater than the permitted circle-of-confusion diameter.

Since the second optical system 124 is moved to the telephoto side for zooming, the field angle of the second imaging device 125 is equal to 96.0×6.25×640/1,000=384.0 mm, which is different from that of the first imaging device 115. Since increasing the focal length and moving the zoom position to the telephoto side in the above manner narrow the field angle, the object may be outside the visual field if the object exists at a position not near the optical axis. In this case, a configuration is desired in which the visual field is capable of being moved to an area apart from the optical axis using a known technique to move the optical axis and the position of the imaging device.

Although the example is described in which the focal length of the second optical system 124 is changed based on the permitted motion blur value, the focal length of the second optical system 124 is changed based on the determination value of the motion amount if the determination value of the motion amount is lower than the permitted motion blur value.

Referring back to FIG. 3, in Step S315, the second control circuit 121 performs the AF using the second optical system 124 based on the information about the main object that is selected when the switch SW1 is turned on.

In Step S316, the second control circuit 121 performs the AE for the first imaging device 115 based on the information about the main object that is selected when the switch SW1 is turned on.

In Step S317, the first control circuit 111 determines whether a switch SW2 in the shutter switch included in the operation member 130 is turned on in response to full-depression of the shutter switch. The process repeats Step S312 to Step S316 until the switch SW2 is turned on.

If the first control circuit 111 determines in Step S317 that the switch SW2 is turned on (YES in Step S317), in Step S318 in FIG. 4, the first control circuit 111 sets an exposure period based on the result of the AE performed in Step S313 and starts the exposure of the first imaging device 115.

In Step S319, the second control circuit 121 sets a frame rate that is a predetermined-number times (for example, 50 times) as high as 1,000 fps or the frame rate set for the first imaging device 115 and starts the exposure of the second imaging device 125. When the exposure time corresponding to the set frame rate has been elapsed, the second imaging device 125 repeats the step to supply the analog image signal that is acquired to the second AD conversion circuit 126 and instantly start the next exposure. In other words, the exposure of the second imaging device 125 is repeated at a frame rate higher than that of the first imaging device 115 during one exposure period of the first imaging device 115.

Figure 6:
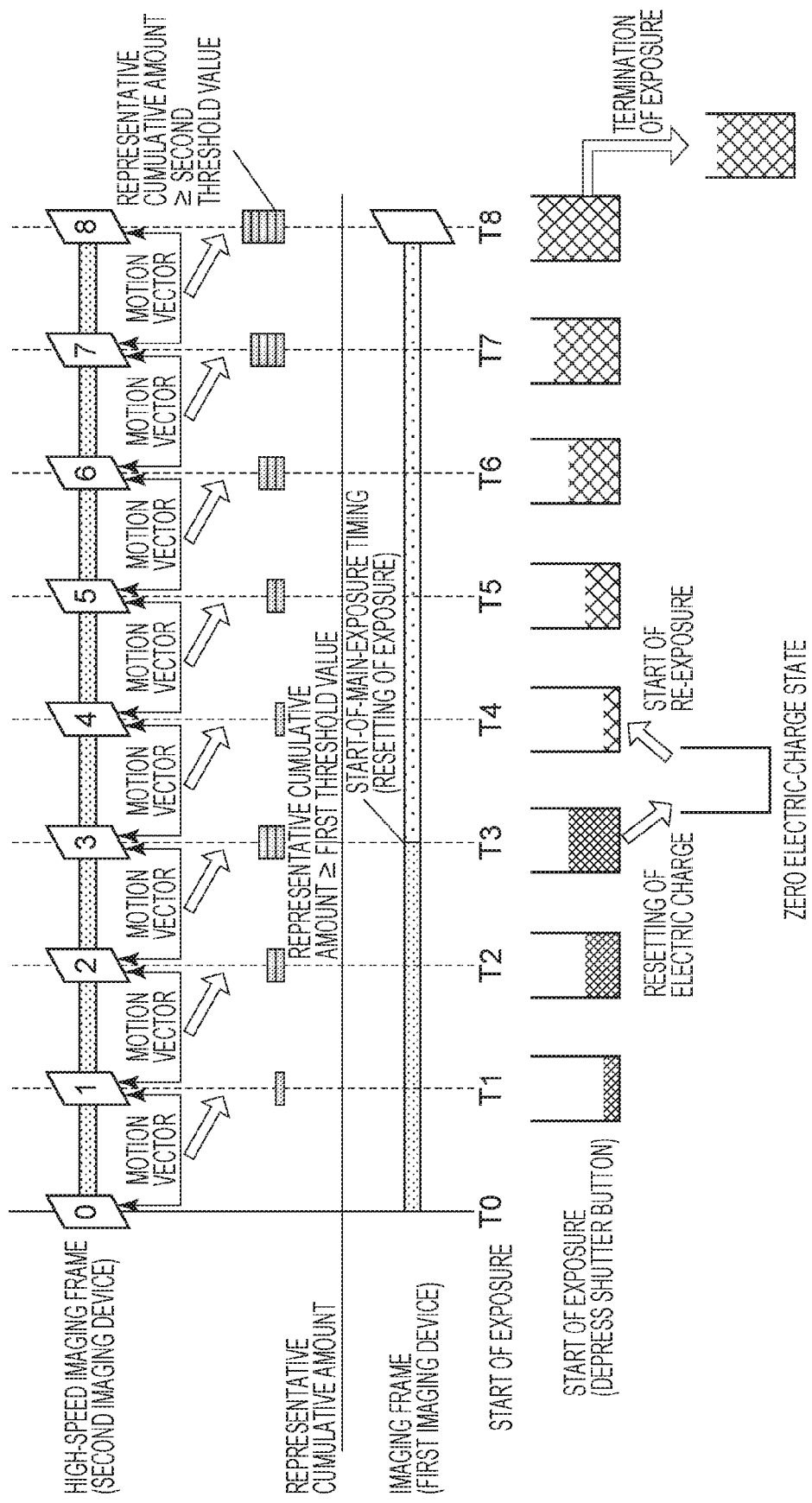
FIG. 6 is a diagram for describing the operation by a first imaging device, a second imaging device, and the timing generation circuit in the first embodiment of the present invention.

FIG. 6 is a diagram for describing the operation by the first imaging device 115, the second imaging device 125, and the timing generation circuit 200 in the first embodiment. Referring to FIG. 6, when the shutter button is fully depressed by the user at a time T0 to turn on the switch SW2, the first imaging device 115 in the first imaging unit 110 instantly starts the exposure. In addition, the second imaging device 125 in the second imaging unit 120 starts to capture an image at a high frame rate. After the time T0 when the switch SW2 is turned on, the second imaging device 125 continuously performs the image capturing for a short exposure time at a time T1, a time T2, a time T3, . . . .

In Step S320, the motion vector calculation circuit 201 in the timing generation circuit 200 calculates the motion vector between the frames of the image data acquired by the second imaging device 125 and motion vector reliability. The motion vector is the vector indicating the amount of horizontal movement and the amount of vertical movement of the object between the frames. A method of calculating the motion vector is described in detail with reference to FIG. 7 to FIG. 9.

Figure 7:
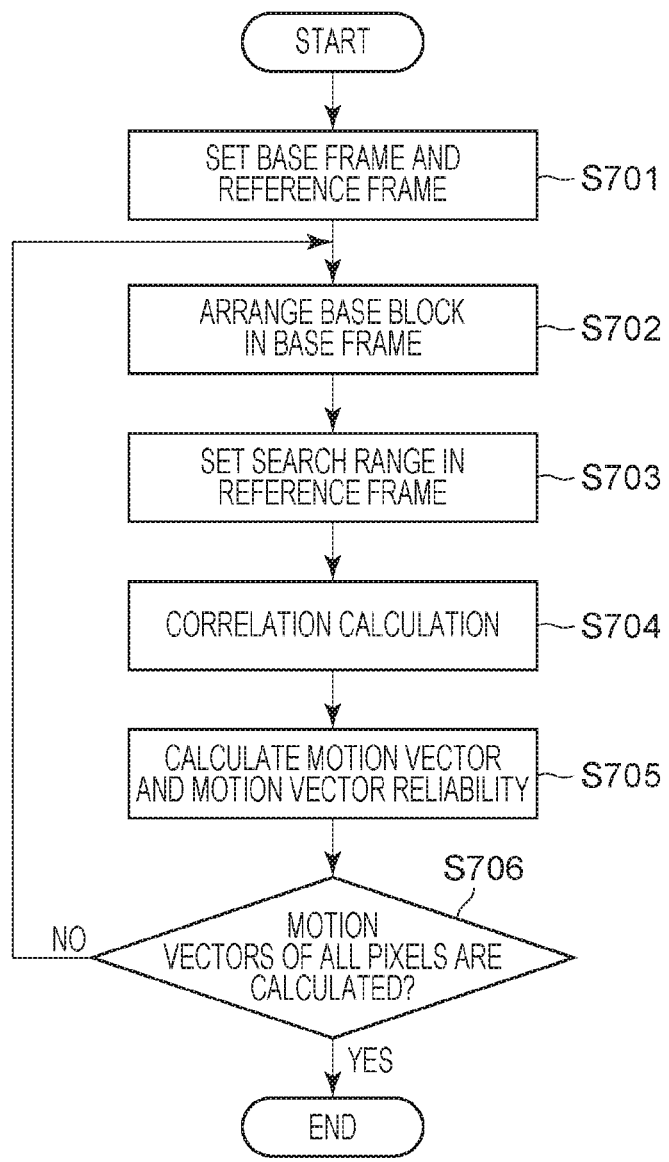
FIG. 7 is a flowchart of a process to calculate a motion vector and motion vector reliability by a motion vector calculation circuit of the first embodiment of the present invention.
Figure 8A:
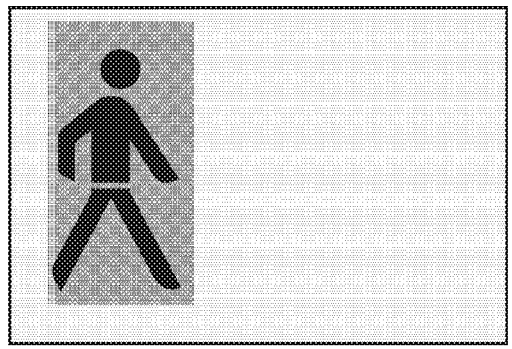
FIG. 8A illustrates image data for an M-th frame.
Figure 8B:
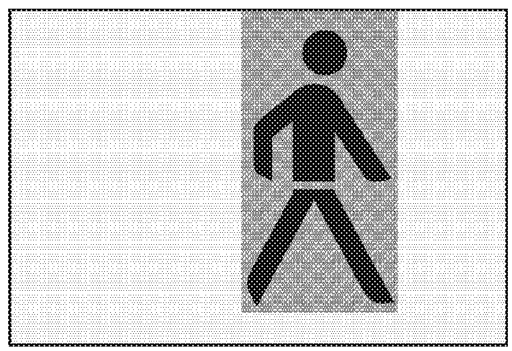
FIG. 8B illustrates image data for an M+1-th frame.
Figure 8C:
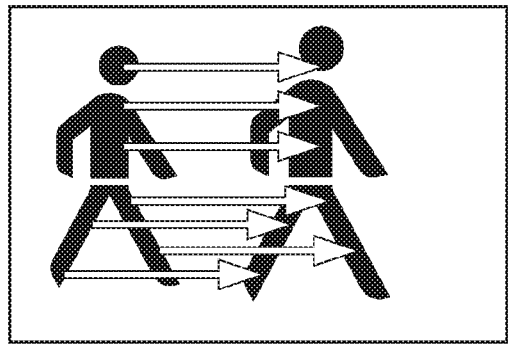
FIG. 8C illustrates the motion vectors between the M-th frame and the M+1-th frames.
Figure 9:
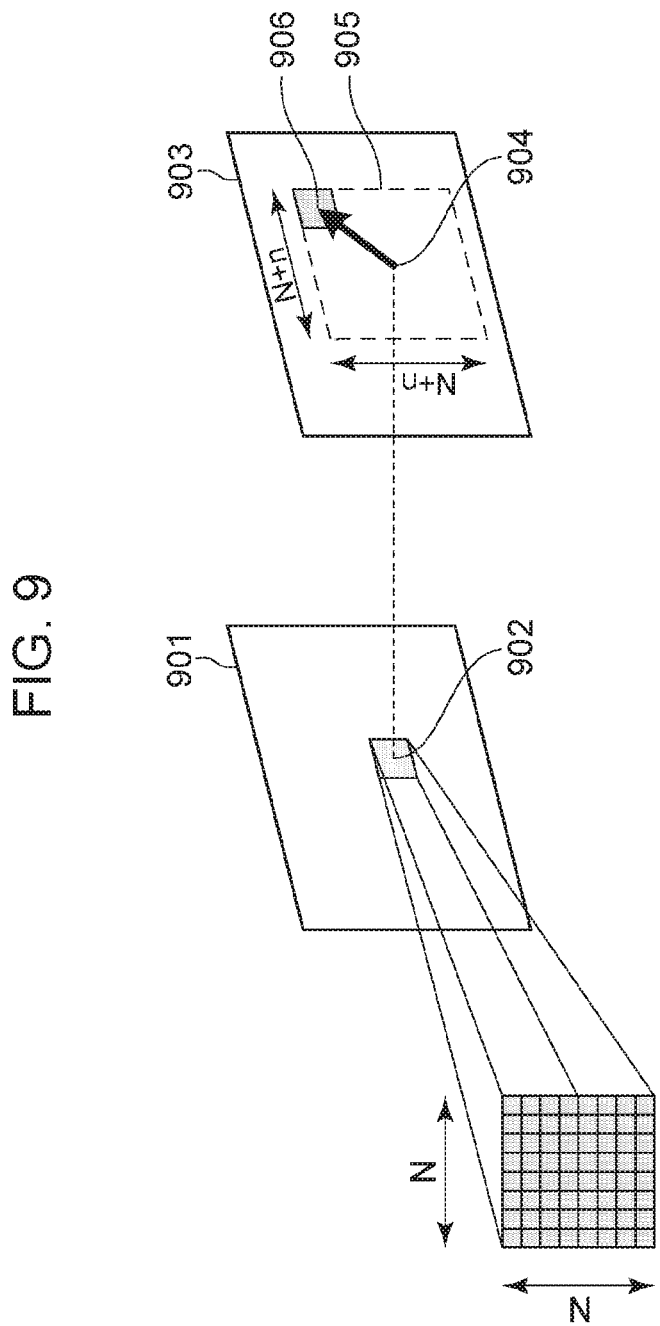
FIG. 9 is a diagram for describing how the motion vector is calculated using a block matching method.

FIG. 7 is a flowchart of a process to calculate the motion vector and the motion vector reliability by the motion vector calculation circuit 201. FIGS. 8A to 8C are diagrams for describing the method of calculating the motion vector. FIG. 8A illustrates the image data for an M-th frame. FIG. 8B illustrates the image data for an M+1-th frame. FIG. 8C illustrates the motion vectors between the M-th frame and the M+1-th frames. Only representative motion vectors are illustrated in FIG. 8C for simplification. Here, M denotes a positive integer. FIG. 9 is a diagram for describing how the motion vector is calculated using a block matching method. Although the block matching method is exemplified as the method of calculating the motion vector in the first embodiment, the method of calculating the motion vector is not limited to this. The motion vector may be calculated using, for example, a gradient method.

Referring to FIG. 7, in Step S701, the image data about two frames that are temporally adjacent to each other is input into the motion vector calculation circuit 201. The motion vector calculation circuit 201 sets the M-th frame as a base frame and sets the M+1-th frame as a reference frame.

In Step S702, the motion vector calculation circuit 201 arranges a base block 902 of N pixels×N pixels in a base frame 901, as illustrated in FIG. 9.

In Step S703, the motion vector calculation circuit 201 sets (N+n) pixels×(N+n) pixels around the same coordinate 904 as the center coordinate of the base block 902 in the base frame 901 as a search range 905 in a reference frame 903, as illustrated in FIG. 9.

In Step S704, the motion vector calculation circuit 201 performs correlation calculation between the base block 902 in the base frame 901 and a reference block 906 of N pixels×N pixels around a different coordinate existing in the search range 905 in the reference frame 903 to calculate a correlation value. The correlation value is calculated based on the sum of the difference absolute values between the frames for the pixels in the base block 902 and the reference block 906. Specifically, the coordinate having a minimum sum of the difference absolute values between the frames has the highest correlation value. The method of calculating the correlation value is not limited to the method of calculating the sum of the difference absolute values between the frames. For example, a method of calculating the correlation value based on a difference sum of squares or a normalized cross-correlation value between the frames may be adopted. In the example illustrated in FIG. 9, the reference block 906 has the highest correlation. The motion vector is capable of being calculated in units of sub-pixels using a known technique. Specifically, a three-point interpolation method according to Equations (1) to (4) is used in continuous pieces of correlation value data C(k) illustrated in FIG. 10.

$$x = k + D/\text{SLOP} \quad (1)$$

$$C(x) = C(k) - |D| \quad (2)$$

$$D=\{C(k-1)-C(k+1)\}/2 \quad (3)$$

$$\text{SLOP}=\text{MAX}\{C(k+1)-C(k),C(k-1)-C(k)\} \quad (4)$$

Figure 10:
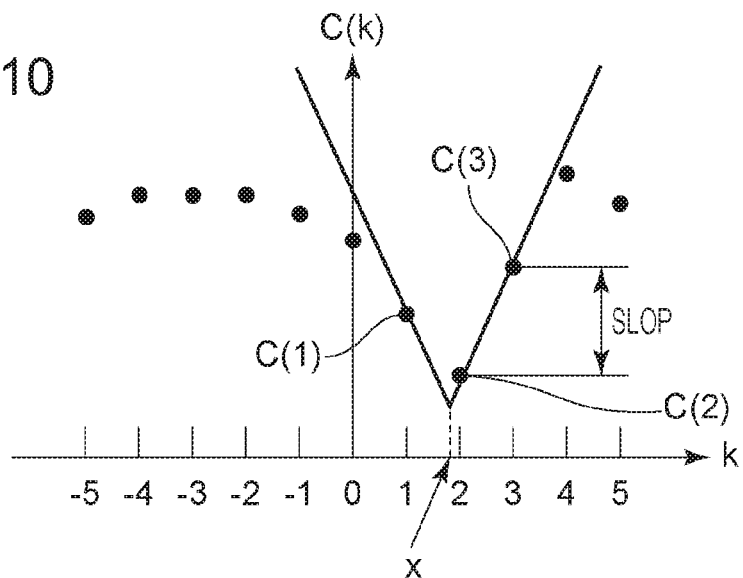
FIG. 10 is a diagram for describing a three-point interpolation method.

Here, k=2 in FIG. 10.

The resolution in units of sub-pixels is set to 0.5 pixels in the first embodiment of the present invention. Although Equation (1) concerns the x component, the y component is capable of being calculated in the same manner.

In Step S705 in FIG. 7, the motion vector calculation circuit 201 calculates the motion vector based on the coordinate of the reference block having the highest correlation value calculated in Step S704 and uses the correlation value of the motion vector as the motion vector reliability. In the case of the example illustrated in FIG. 9, the motion vector is calculated based on the same coordinate 904 corresponding to the center coordinate of the base block 902 in the base frame 901 and the center coordinate of the reference block 906 in the search range 905 in the reference frame 903. In other words, the distance from the same coordinate 904 to the center coordinate of the reference block 906 and the direction are calculated as the motion vector. The correlation value, which is the result of the correlation calculation with the reference block 906 in the calculation of the motion vector, is calculated as the motion vector reliability. The motion vector reliability is increased as the correlation value between the base block and the reference block is increased.

In Step S706, the motion vector calculation circuit 201 determines whether the motion vectors are calculated for all the pixels in the base frame 901. If the motion vector calculation circuit 201 determines that the motion vectors are not calculated for all the pixels in the base frame 901 (NO in Step S706), the process goes back to Step S702. In Step S702, the base block 902 of N pixels×N pixels is arranged in the base frame 901 around a pixel for which the motion vector is not calculated and Steps S703 to S705 are performed in the above manner. In other words, the motion vector calculation circuit 201 repeats Steps S702 to S705 while moving the base block 902 in FIG. 9 to calculate the motion vectors of all the pixels in the base frame 901. An example of the motion vectors is illustrated in FIG. 8C. In the examples in FIG. 8A to FIG. 8C, a person moves from left to right between the M-th frame in FIG. 8A and the M+1-th frame in FIG. 8B. A typical example of the motion vectors when the object moves in the above manner is illustrated in FIG. 8C. The starting point of the motion vectors illustrated in FIG. 8C is at the position of the object existing in the M-th frame and the ending point thereof is at the position of the object in the M+1-th frame. The motion vector calculation circuit 201 may calculate the motion vectors of certain pixels, which are smaller than all the pixels, instead of calculating the motion vectors of all the pixels.

The motion vectors between the two high-speed imaging frames that are temporally adjacent to each other and the motion vector reliability are calculated in the above manner.

The moving speed of the object may be varied. Accordingly, a configuration is desired in which the magnitude of the motion vector between the two frames that are temporally adjacent to each other is converted into the moving speed on the object surface and the focal length, the image magnification, and the field angle of the second optical system 124 are appropriately varied during the exposure of the first imaging device 115 using the calculation method described above.

Next, the operation in time series to calculate the motion vector and the motion vector reliability for the image data acquired from the second imaging device 125 by the motion vector calculation circuit 201 will now be described with reference to FIG. 6.

At the time T1, the motion vector calculation circuit 201 calculates the motion vector between the frames of the pieces of image data acquired at the time T0 and the time T1 and the motion vector reliability based on the process in the flowchart illustrated in FIG. 7. Then, at the time T2, the motion vector calculation circuit 201 calculates the motion vector between the frames of the pieces of image data acquired at the time T1 and the time T2 and the motion vector reliability. Similar processing is repeated at the time T3 and the subsequent times to calculate the motion vectors and the motion vector reliabilities between the frames for the pieces of image data acquired from the second imaging device 125.

The motion vector is calculated in the above manner in Step S320 in FIG. 4.

Referring back to FIG. 4, in Step S321, the cumulative amount calculation circuit 202 tracks the motion vector calculated in Step S320 in multiple frames to calculate a cumulative amount of the motion vectors. Then, the representative cumulative amount calculation circuit 203 determines a representative cumulative amount representative of all the frames based on the calculated cumulative amount of the motion vectors.

Figure 11:
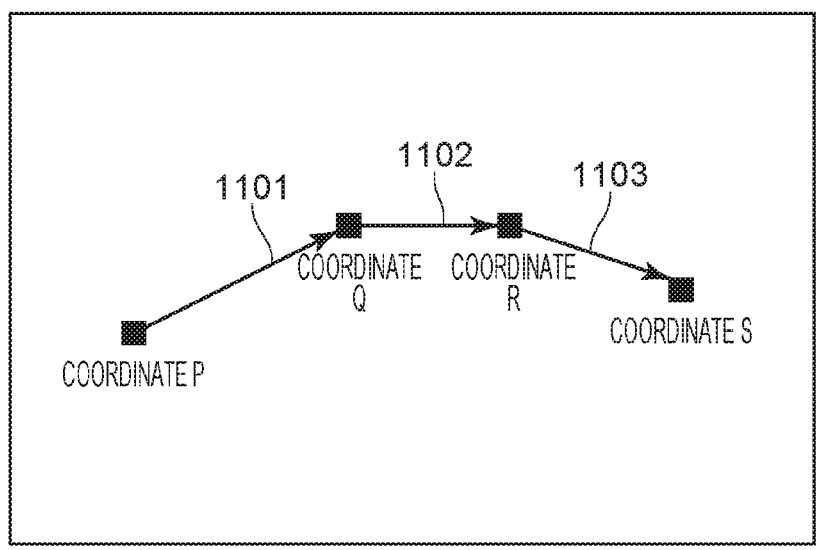
FIG. 11 illustrates the motion vectors between multiple frames.

The method of calculating the cumulative amount of the motion vectors will now be described with reference to FIG. 11. FIG. 11 illustrates the motion vectors between multiple frames, which is calculated in Step S320. Although the method of calculating the cumulative amount of the motion vectors during a period from the time T0 to the time T3 is described for simplification, the cumulative amount of the motion vectors is calculated in the same manner in the subsequent period.

Referring to FIG. 11, a motion vector 1101 is calculated between the frame at the time T0 and the frame at the time T1 in FIG. 6. A motion vector 1102 is calculated between the frame at the time T1 and the frame at the time T2 in FIG. 6. A motion vector 1103 is calculated between the frame at the time T2 and the frame at the time T3 in FIG. 6.

The cumulative amount calculation circuit 202 searches the motion vectors calculated between the frames at the time T1 and the time T2 for the motion vector using an ending point coordinate Q of the motion vector 1101 calculated between the frames at the time T0 and the time T1 as the starting point coordinate. Then, the cumulative amount calculation circuit 202 joins the motion vector 1102 meeting the condition to the motion vector 1101. In addition, the cumulative amount calculation circuit 202 searches the motion vectors calculated between the frames at the time T2 and the time T3 for the motion vector using an ending point coordinate R of the motion vector 1102 calculated between the frames at the time T1 and the time T2 as the starting point coordinate. Then, the cumulative amount calculation circuit 202 joins the motion vector 1103 meeting the condition to the motion vector 1102. The motion vectors are joined in the same manner in the subsequent period.

The process of joining the motion vectors in multiple frames is performed for all the motion vectors calculated at the time T0 to calculate tracking motion vectors of all the pixels. The tracking motion vectors that are calculated indicates that the object existing a coordinate P at the time T0 moves to the coordinate Q at the time T1, moves to the coordinate R at the time T2, and moves to a coordinate S at the time T3.

The method of calculating the cumulative amount of the motion vectors based on the tracking motion vector by the cumulative amount calculation circuit 202 will now be described.

The cumulative amount calculation circuit 202 calculates the length of the tracking motion vector as a cumulative amount (VecLen) of the motion vectors according to Equation (5):

$$VecLen = VecLen1 + VecLen2 + VecLen3 \quad (5)$$

VecLen1 indicates the motion vector length of the motion vector 1101 calculated between the frames at the time T0 and the time T1. VecLen2 indicates the motion vector length of the motion vector 1102 calculated between the frames at the time T1 and the time T2. VecLen3 indicates the motion vector length of the motion vector 1103 calculated between the frames at the time T2 and the time T3. The cumulative amount calculation circuit 202 calculates the sum total of the motion vector lengths composing the tracking motion vector as the cumulative amount of the motion vectors according to Equation (5). The cumulative amount calculation circuit 202 performs the calculation of the cumulative amount of the motion vectors described above for the tracking motion vectors of all the pixels to calculate the cumulative amounts of the motion vectors of all the pixels.

The cumulative amount calculation circuit 202 may exclude the motion vector having a motion vector reliability lower than a predetermined value from the calculation of the sum total of the motion vector lengths according to Equation (5). In addition, the cumulative amount calculation circuit 202 may exclude the motion vector having a motion vector reliability lower than a predetermined value and the temporally subsequent motion vectors from the calculation of the sum total of the motion vector lengths according to Equation (5). This enables the calculation of the cumulative amount of the motion vectors only using the motion vectors having higher motion vector reliabilities. Each motion vector may be separated into the x-direction component and the y-direction component to calculate the sum total of the motion vector lengths for each direction.

The method of calculating the representative cumulative amount will now be described. The representative cumulative amount calculation circuit 203 selects a maximum value, among the cumulative amounts of the motion vectors acquired from all the pixels in each frame, and determines the selected maximum cumulative amount of the motion vectors as the representative cumulative amount. This processing is performed for each frame to calculate one representative cumulative amount for each frame, as illustrated in FIG. 6.

The representative cumulative amount calculated by the representative cumulative amount calculation circuit 203 is not limited to the one based on the maximum value, among the cumulative amounts of the motion vectors acquired from all the pixels in each frame, and may be an average value or a median of the cumulative amounts of the motion vectors of all the pixels in the frame. When the cumulative amount of the motion vectors is separated into the x-direction component and the y-direction component, the representative cumulative amount in each direction may be determined.

Referring back to FIG. 4, in Step S322, the timing determination circuit 204 determines whether the representative cumulative amount is greater than or equal to the first threshold value. If the representative cumulative amount is not greater than or equal to the first threshold value (NO in Step S322), the timing determination circuit 204 determines that the object does not start to move and the process goes to Step S323. This first threshold value is set to detect the timing when the object starts to move based on the start-of-motion level set in Step S304, as described above, and is set independently of the second threshold value set in Step S304. The first threshold value is capable of being arbitrarily set in accordance with the motion of the object an image of which is to be captured. Specifically, a smaller first threshold value is desirably set for the object, for example, an insect such as a dragonfly, which starts to move rapidly, compared with that for the object, such as a person, who starts to move slowly. The first threshold value may be automatically set depending on the image capturing mode, for example, the first threshold value supposing the motion of a person is set in a portrait image capturing mode and the first threshold value supposing the motion of an insect is set in a macro image capturing mode. Since the first threshold value and the second threshold value are capable of being set to arbitrary values within a predetermined range by the user, the first threshold value may be greater than the second threshold value or the second threshold value may be greater than the first threshold value depending on the set value.

In Step S323, the first control circuit 111 in the first imaging unit 110 determines whether the exposure time of the first imaging device 115 reaches the exposure time that is set based on the AE performed in Step S313. If the exposure time of the first imaging device 115 does not reach the exposure time that is set based on the AE performed in Step S313 (NO in Step S323), the process goes back to Step S322. If the exposure time of the first imaging device 115 reaches the exposure time that is set based on the AE performed in Step S313 (YES in Step S323), the process goes to Step S324.

In Step S324, the first control circuit 111 stops the exposure of the first imaging device 115 and performs certain processing to the analog image signal generated by the first imaging device 115 with the first AD conversion circuit 116 and the first image processing circuit 117. The image data subjected to the image processing in the first image processing circuit 117 is supplied to the display device 119 to be used as the image data for live view.

In Step S325, the first control circuit 111 stops the exposure of the second imaging device 125 via the second control circuit 121.

In Step S326, the second control circuit 121 resets the representative cumulative amount calculated by the cumulative amount calculation circuit 202 and the representative cumulative amount calculation circuit 203. Then, the process goes back to Step S318.

If the representative cumulative amount is greater than or equal to the first threshold value (YES in Step S322), the timing determination circuit 204 determines that the object starts to move and the process goes to Step S327.

In Step S327, the timing determination circuit 204 supplies a signal for instructing the resetting process to the first imaging unit 110. The resetting process is instantly performed when it is determined that the representative cumulative amount is greater than or equal to the first threshold value. In the example illustrated in FIG. 6, the representative cumulative amount based on the motion vectors calculated between the frames until the time T3 is greater than or equal to the first threshold value. Accordingly, at this time, the timing determination circuit 204 supplies the signal for instructing the resetting process to the first imaging unit 110 via the second control circuit 121. When the representative cumulative amounts are separately calculated in the X direction and the Y direction, the signal for instructing the resetting process is output if either of the representative cumulative amounts is greater than or equal to the first threshold value.

In Step S328, upon reception of the signal for instructing the resetting process from the second control circuit 121, the first control circuit 111 stops the exposure of the first imaging device 115 and causes the first imaging device 115 to perform the resetting process to discard the electric charge accumulated in each pixel. When the resetting process is completed and the electric charge accumulated in the pixels is practically set to zero, the first control circuit 111 instantly starts the exposure of the first imaging device 115.

In Step S329, the second control circuit 121 stops the exposure of the second imaging device 125 for the resetting process and starts the exposure of the second imaging device 125 in time with start of the exposure of the first imaging device 115.

In Step S330, the second control circuit 121 resets the representative cumulative amount that has been calculated by the representative cumulative amount calculation circuit 203 and causes the representative cumulative amount calculation circuit 203 to newly start the calculation of the representative cumulative amount. In the example illustrated in FIG. 6, the second control circuit 121 resets the representative cumulative amount that has been calculated until the time T3 and starts the calculation of the representative cumulative amount at the time T4 again.

In Step S331, the timing determination circuit 204 determines whether the representative cumulative amount is greater than or equal to the second threshold value set in Step S304. If the representative cumulative amount is not greater than or equal to the second threshold value (NO in Step S331), the process goes to Step S332.

In Step S332, the first control circuit 111 in the first imaging unit 110 determines whether the exposure time of the first imaging device 115 reaches the exposure time that is set based on the AE performed in Step S313. If the exposure time of the first imaging device 115 does not reach the exposure time that is set based on the AE performed in Step S313 (NO in Step S332), the process goes back to Step S331. If the exposure time of the first imaging device 115 reaches the exposure time that is set based on the AE performed in Step S313 (YES in Step S332), the process goes to Step S334.

In Step S334, the first control circuit 111 stops the exposure of the first imaging device 115.

If the representative cumulative amount is greater than or equal to the second threshold value (YES in Step S331), the process goes to Step S333.

In Step S333, the timing determination circuit 204 supplies a signal for instructing termination of the exposure to the first imaging unit 110. This step is instantly performed when it is determined that the representative cumulative amount is greater than or equal to the second threshold value. In the example illustrated in FIG. 6, the representative cumulative amount based on the motion vectors calculated between the respective frames until the time T8 is greater than or equal to the second threshold value. Accordingly, at this time, the timing determination circuit 204 supplies the signal for instructing termination of the exposure to the first imaging unit 110 via the second control circuit 121. When the representative cumulative amounts are separately calculated in the X direction and the Y direction, the signal for instructing termination of the exposure is output if either of the representative cumulative amounts is greater than or equal to the second threshold value.

In other words, when it is determined that the representative cumulative amount is greater than or equal to the second threshold value, the process directly goes to Step S333 and Step S334. The first control circuit 111 stops the exposure of the first imaging device 115 even if the exposure time of the first imaging device 115 does not reach an appropriate time. The first control circuit 111 supplies the analog image signal generated by the first imaging device 115 to the first AD conversion circuit 116. The digital image data generated by the first AD conversion circuit 116 is subjected to certain processing in the first image processing circuit 117 and is supplied to the image output circuit 118 as image data for recording. The image output circuit 118 writes the image data for recording to a recording media removable from the imaging apparatus 100 and/or transmits the image data for recording to an external apparatus, such as a smartphone or a server, using the wireless or wired communication function.

In the example illustrated in FIG. 6, the first control circuit 111 stops the exposure of the first imaging device 115 at a time slightly after the time T8.

Practically, time lag occurs, for example, between the time when the frame image at the time T8 is generated in the second imaging device 125 and the time when the representative cumulative amount is calculated and between the time when the signal is output from the timing determination circuit 204 and the time when the signal output from the timing determination circuit 204 reaches the first control circuit 111. However, setting the threshold values in consideration of the time lag enables the effect of the time lag to be suppressed.

In Step S335, the second control circuit 121 in the second imaging unit 120 stops the exposure of the second imaging device 125.

In Step S336, the first control circuit 111 in the first imaging unit 110 determines whether the image capturing mode is kept. If the image capturing mode is kept (YES in Step S336), the process goes back to Step S306. If another mode is selected (NO in Step S336), the process goes back to Step S302.

As described above, in the first embodiment, the exposure of the first imaging device 115 during the exposure is stopped based on the motion amount of the object during the exposure period of the first imaging device 115 for the resetting process and the exposure of the first imaging device 115 is instantly restarted. Accordingly, it is possible to capture an image in time with the start-of-motion of the object.

Adjusting the first threshold value compared with the representative cumulative amount in Step S322 enables the magnitude of the motion of the object, which is supposed to be the start-of-motion, to be adjusted. For example, it is possible to perform the resetting of the exposure and the restarting of the exposure upon detection of a smaller motion with the decreasing first threshold value.

Although the example is described in the first embodiment, in which the timing when the object starts to move from a resting state is detected and the image capturing is performed, the first embodiment is also applicable to an example in which the timing when the object makes a transition from the moving state to the resting state is detected.

When the object comes to rest from the moving state, the motion vector calculated by the motion vector calculation circuit 201 is gradually decreased.

Accordingly, any of the tracking motion vectors having the joined motion vector that is gradually decreased is selected from the tracking motion vectors calculated by the cumulative amount calculation circuit 202. Then, the timing determination circuit 204 arranges the magnitudes of the respective joined motion vectors in order in time in the selected tracking motion vector to calculate the rate of decrease in the magnitude of the motion vector between the two continuous motion vectors. The timing determination circuit 204 performs the calculation based on the calculated rate of decrease to estimate the magnitude of the motion vector of the frame to be subsequently acquired from the second imaging device 125. The timing determination circuit 204 supplies the signal for instructing the resetting process to the first imaging unit 110 if the estimated magnitude of the motion vector is lower than the first threshold value. When the first threshold value is a positive value close to zero, it is possible to perform the resetting process and the restarting of the exposure of the first imaging device 115 at the timing when the motion of the object stops.

Since the analog image signal that is read out when the exposure of the first imaging device 115 is stopped in Step S324 is not used for recording in the first embodiment, the resolution may be decreased by adding or averaging the signals of surrounding pixels. Alternatively, the read-out method of the first imaging device 115 may be changed so that the resolution of the image data when the exposure is started in Step S328 is higher than that when the exposure is started in Step S318. This reduces the processing load in the generation of the image data that is not for recording.

Although the example is described in the first embodiment, in which the resetting process of the entire frame and the start of the re-exposure of the first imaging device 115 are instructed based on the signal output from the timing determination circuit 204, the first embodiment is not limited to this. For example, when the first imaging device 115 has a configuration in which the exposure time is capable of being controlled for each line, each area, or each pixel, the timing determination circuit 204 may output the signal for instructing the resetting process and start of the re-exposure based on the cumulative amount for each portion of the first imaging device 115. Alternatively, the entire frame may be divided into divided blocks and the signal for instructing the resetting process and start of the re-exposure may be output for each divided block based on the cumulative amount representative of the divided blocks.

Although the example is described in the first embodiment, in which the cumulative amount calculation circuit 202 calculates the sum total of the lengths of the respective joined motion vectors as the cumulative amount of the motion vectors, the first embodiment is not limited to this. When each motion vector composing the tracking motion vector illustrated in FIG. 9 or part of each motion vector passes the same coordinate, the lengths passing the same coordinate may be excluded from the calculation of the sum total of the motion vector lengths according to Equation (5). This enables excess addition of the motion vectors for, for example, the object having a minor periodic motion (repetitive motion), who goes back and forth between adjacent coordinates, to be suppressed.

Although the start-of-motion of the object is detected based on the motion vectors in the first embodiment, a configuration may be adopted in which, instead of the motion vectors, the sum of the difference absolute values between the frames is compared with the first threshold value and the second threshold value in order to reduce the calculation load.

In the first embodiment, the timing of the resetting process and the timing of start of the re-exposure of the first imaging device 115 are determined based on the result of the motion analysis using the images resulting from changing of the focal length, the image magnification, and the field angle of the second imaging unit 120. Accordingly, it is possible to capture an image having little motion blur even when the resolution of the first imaging device 115 is different from that of the second imaging device 125 in the specifications.

Although the resolution of the motion is increased by moving the focal length of the second optical system 124 to the telephoto side in the first embodiment, moving the focal length to the telephoto side in a common lens increases the F value to darken the image. Increasing the sensitivity to brighten the image increases noise to degrade the calculation accuracy of the motion vectors.

Accordingly, a configuration may be adopted in which the maximum amount of movement of the focal length is restricted depending on the magnitude of the noise component of the image acquired by the second imaging device 125.

In addition, a configuration may be adopted in which it is determined whether the image data captured in response to start of the exposure based on the determination indicating that the representative cumulative amount is greater than or equal to the first threshold value is captured at a time desired by the user. For example, the image data that is captured may be a target for recording if a certain operation by the user, for example, full-depression of the shutter button, is performed for the captured image data and the captured image data may be deleted without recording if a certain operation by the user is not performed for the captured image data. The full-depression of the shutter button is only an example and the determination may be based on another button operation or another operation to incline the imaging apparatus 100 in a certain direction as long as the operation is performed by the user. Alternatively, instead of an operation by the user, a method of using detection of a sound, for example, a predetermined word pronounced by the user may be adopted.

Second Embodiment

A second embodiment of the present invention will now be described. In the second embodiment, when the motion amount of the object is increased to some extent at the time when the start-of-motion of the object is detected, the resetting process of the first imaging device 115 is not performed and the exposure is continued.

Figure 13:
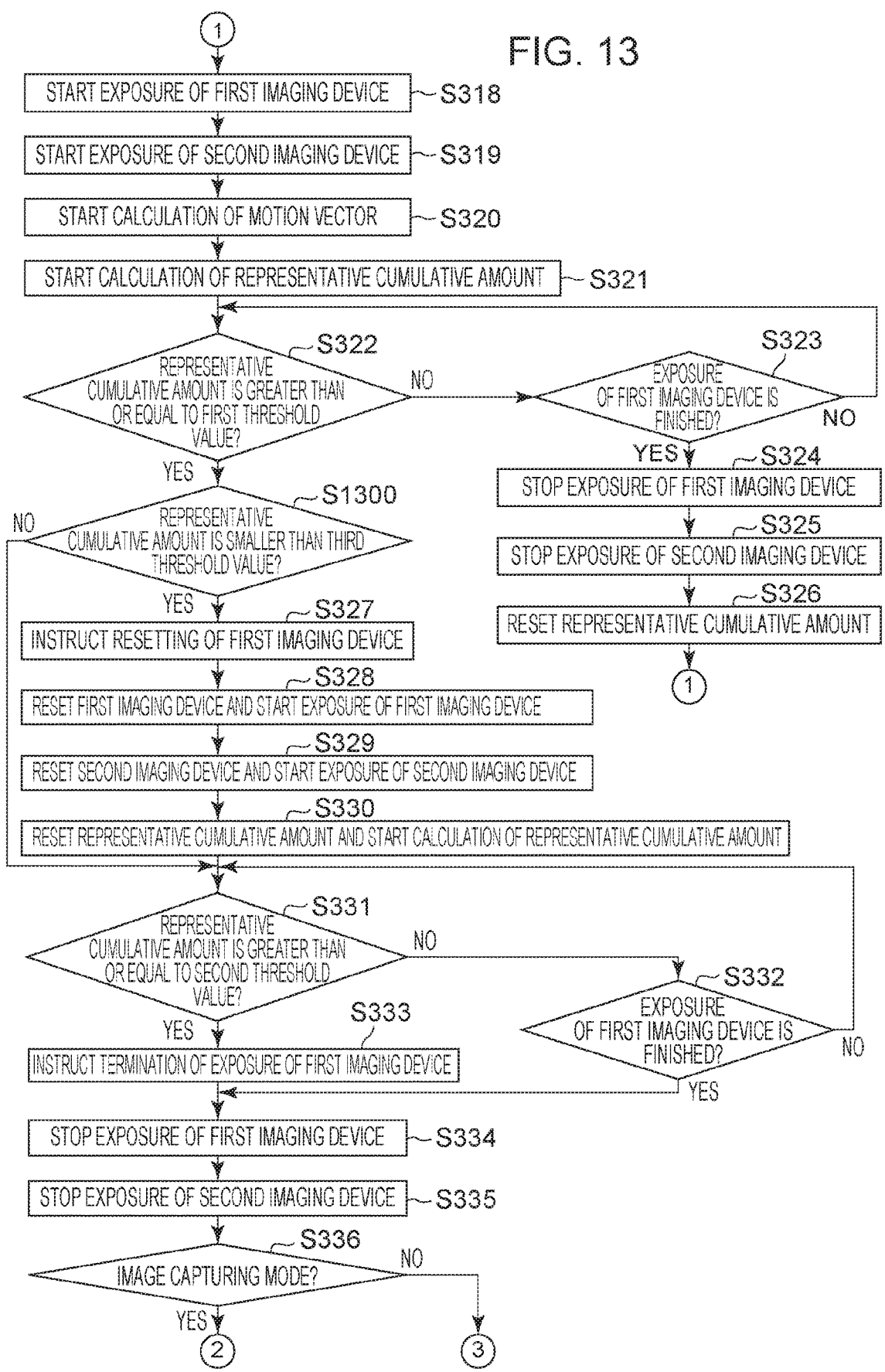
FIG. 13 is a flowchart of an imaging process in the high-speed image capturing mode in a second embodiment of the present invention.

An imaging process in the high-speed image capturing mode in the imaging apparatus 100 of the second embodiment of the present invention will now be described with reference to a flowchart illustrated in FIG. 13. FIG. 13 is the flowchart of the imaging process in the high-speed image capturing mode in the second embodiment. The flowchart illustrated in FIG. 13 differs from the flowchart illustrated in FIG. 4 only in that the flowchart illustrated in FIG. 13 includes Step S1300. It is assumed in the second embodiment that the second threshold value is set to a sufficiently high value, compared with the first threshold value.

Since Steps S318 to S326 and Steps S327 to S336 in FIG. 13 are the same as those in FIG. 4, a description of these steps is omitted herein.

If the timing determination circuit 204 determines in Step S322 in FIG. 13 that the representative cumulative amount calculated by the representative cumulative amount calculation circuit 203 is greater than or equal to the first threshold value, the timing determination circuit 204 determines that the object starts to move and the process goes to Step S1300.

In Step S1300, the timing determination circuit 204 determines whether the representative cumulative amount calculated by the representative cumulative amount calculation circuit 203 is smaller than a third threshold value. The third threshold value is higher than the first threshold value and is lower than the second threshold value. Since it is considered that the object has just started to move if the representative cumulative amount is smaller than the third threshold value (YES in Step S1300), the process goes to Step S327, as in the first embodiment. In Step S327, the exposure of the first imaging device 115 is stopped for the resetting process and the exposure of the first imaging device 115 is instantly started.

In contrast, if the representative cumulative amount is greater than or equal to the third threshold value, it is considered that the motion amount of the object has already greatly exceeded a reference value, on which the determination of the start-of-motion is based. In this case, the exposure of the first imaging device 115 is possibly restarted much later than the start-of-motion even if the resetting process of the first imaging device 115 is performed and the re-exposure of the first imaging device 115 is instantly started. Accordingly, if the representative cumulative amount is greater than or equal to the third threshold value (NO in Step S1300), the imaging apparatus 100 does not perform the resetting process of the first imaging device 115 and continues the exposure of the first imaging device 115. In this case, the process goes to Step S331. This enables the image including the start-of-motion of the object to be captured at an appropriate timing even if the motion amount at the start-of-motion of the object is large.

Figure 14:
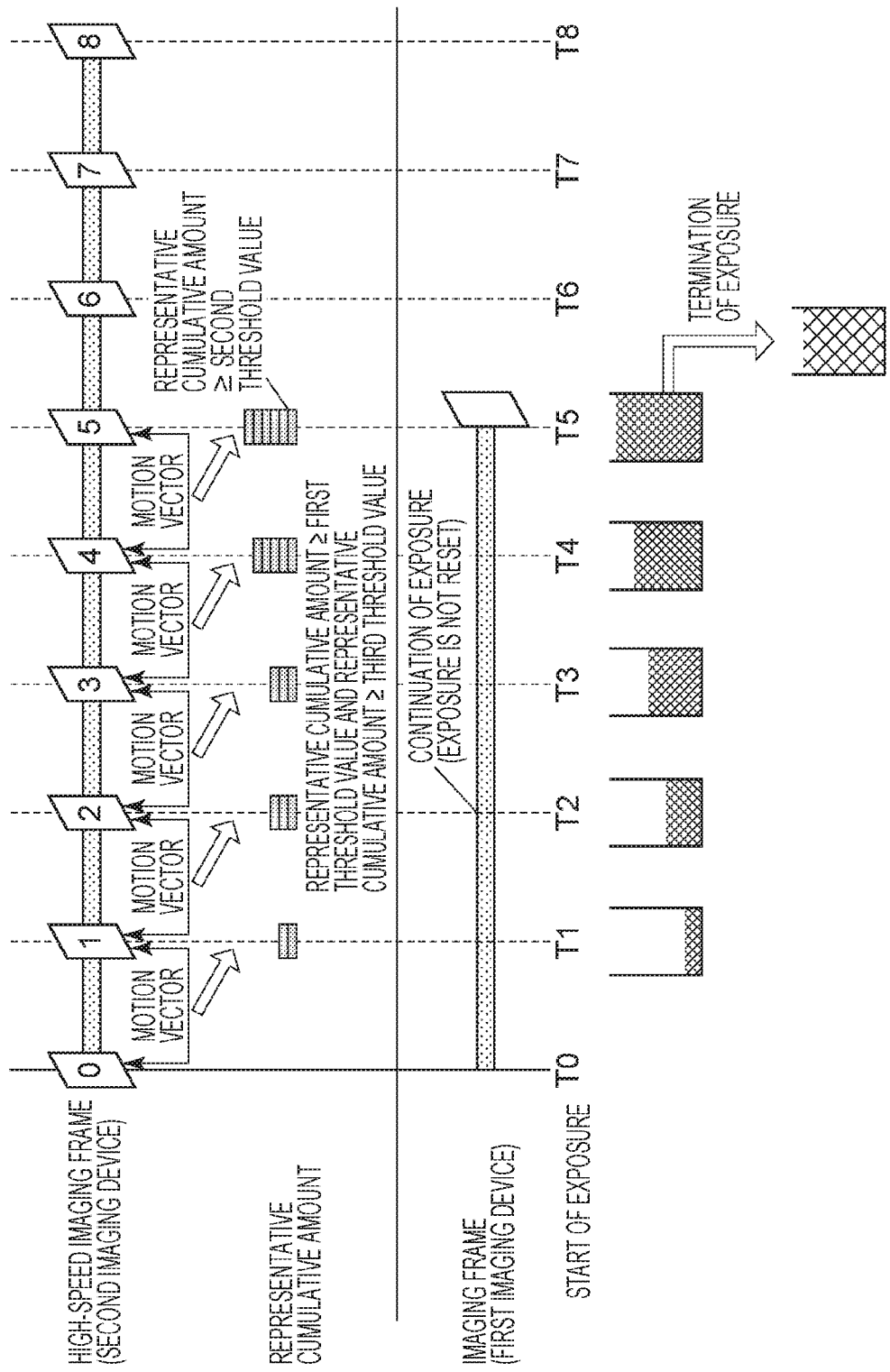
FIG. 14 is a diagram for describing the operation of the first imaging device, the second imaging device, and the timing generation circuit in the second embodiment of the present invention.

FIG. 14 is a diagram for describing the operation of the first imaging device 115, the second imaging device 125, and the timing generation circuit 200 in the second embodiment. In the example illustrated in FIG. 14, the representative cumulative amount based on the motion vectors calculated between the respective frames until the time T2 is greater than or equal to the first threshold value. In addition, at this time, the representative cumulative amount is greater than or equal to the third threshold value, which is higher than the first threshold value. Accordingly, the timing determination circuit 204 does not supplies the signal for instructing the resetting process to the first imaging unit 110 at the time T2 and causes the exposure of the first imaging device 115 to be continued. Then, when the representative cumulative amount becomes greater than or equal to the second threshold value corresponding to the motion blur level, the timing determination circuit 204 supplies the signal for instructing the resetting process to the first imaging unit 110 via the second control circuit 121.

Although the configuration in which the representative cumulative amount is compared with the third threshold value is exemplified here, the second embodiment is not limited to this. Instead of the comparison between the representative cumulative amount and the third threshold value, the exposure time of the first imaging device 115 at the time when the representative cumulative amount exceeds the first threshold value may be compared with a fourth threshold value. In this case, since it takes a time for the object to start to move if the exposure time of the first imaging device 115 is longer than or equal to the fourth threshold value, it is considered that the object has just started to move. Accordingly, the resetting process of the first imaging device 115 is performed and the exposure of the first imaging device 115 is instantly started. In contrast, if the exposure time of the first imaging device 115 is shorter than the fourth threshold value, it is considered that the object has rapidly started to move. Starting the re-exposure of the first imaging device 115 after the resetting process of the first imaging device 115 is performed possibly restarts the exposure of the first imaging device 115 much later than the start-of-motion. Accordingly, the exposure of the first imaging device 115 is started without the resetting process of the first imaging device 115.

As described above, also in the second embodiment, the exposure of the first imaging device 115 is stopped based on the motion amount of the object during the exposure period of the first imaging device 115 for the resetting process and the exposure of the first imaging device 115 is instantly restarted. Accordingly, it is possible to capture an image in time with the start-of-motion of the object. In addition, switching between stopping of the exposure for the resetting process and continuation of the exposure is performed based on the motion amount at the start-of-motion in the second embodiment. Accordingly, it is possible to capture the image including the start-of-motion of the object at an appropriate timing regardless of the magnitude of the motion amount at the start-of-motion of the object.

Third Embodiment

A third embodiment of the present invention will now be described. In the third embodiment, the exposure of the first imaging device 115 is stopped for the resetting process and the exposure of the first imaging device 115 is instantly restated if the distance between multiple objects meets a predetermined condition, without using the motion amount of the object.

In the third embodiment, the second image processing circuit 127 includes a second timing generation circuit 1500, in addition to the timing generation circuit 200.

Figure 15:
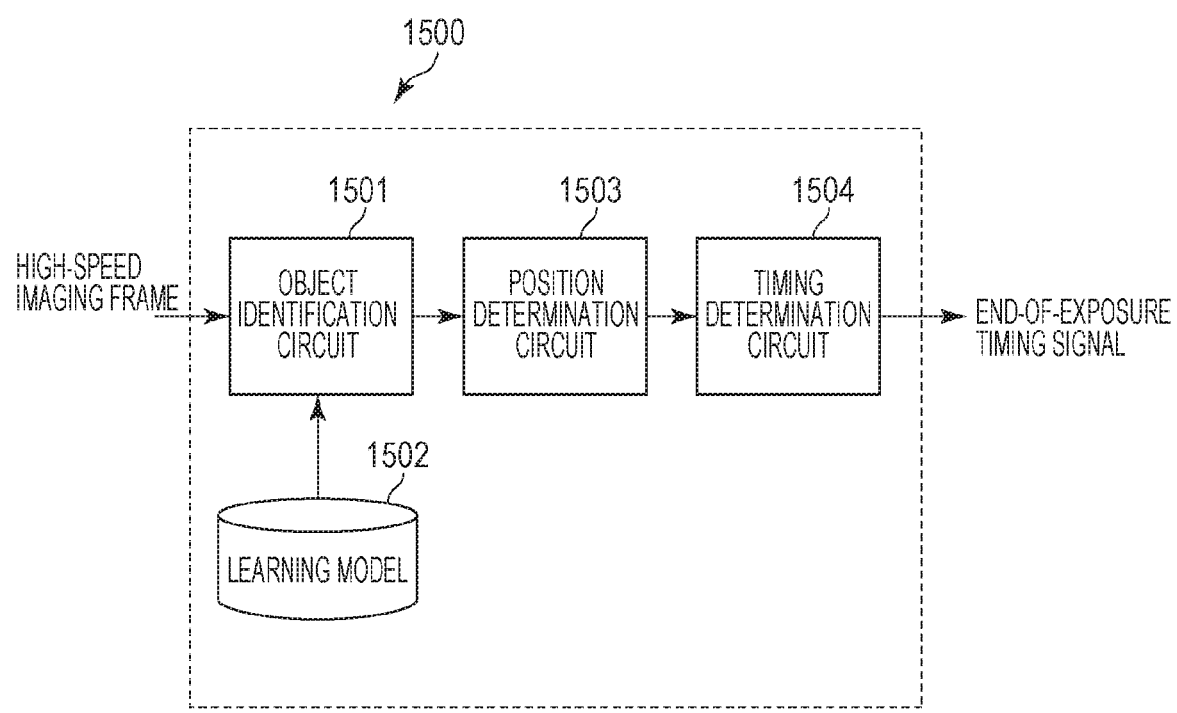
FIG. 15 is a block diagram illustrating an example of the configuration of a second timing generation circuit according to a third embodiment of the present invention.

FIG. 15 is a block diagram illustrating an example of the configuration of the second timing generation circuit according to the third embodiment. Referring to FIG. 15, the second timing generation circuit 1500 includes an object identification circuit 1501, a learning model 1502, a position determination circuit 1503, and a timing determination circuit 1504.

Figure 16:
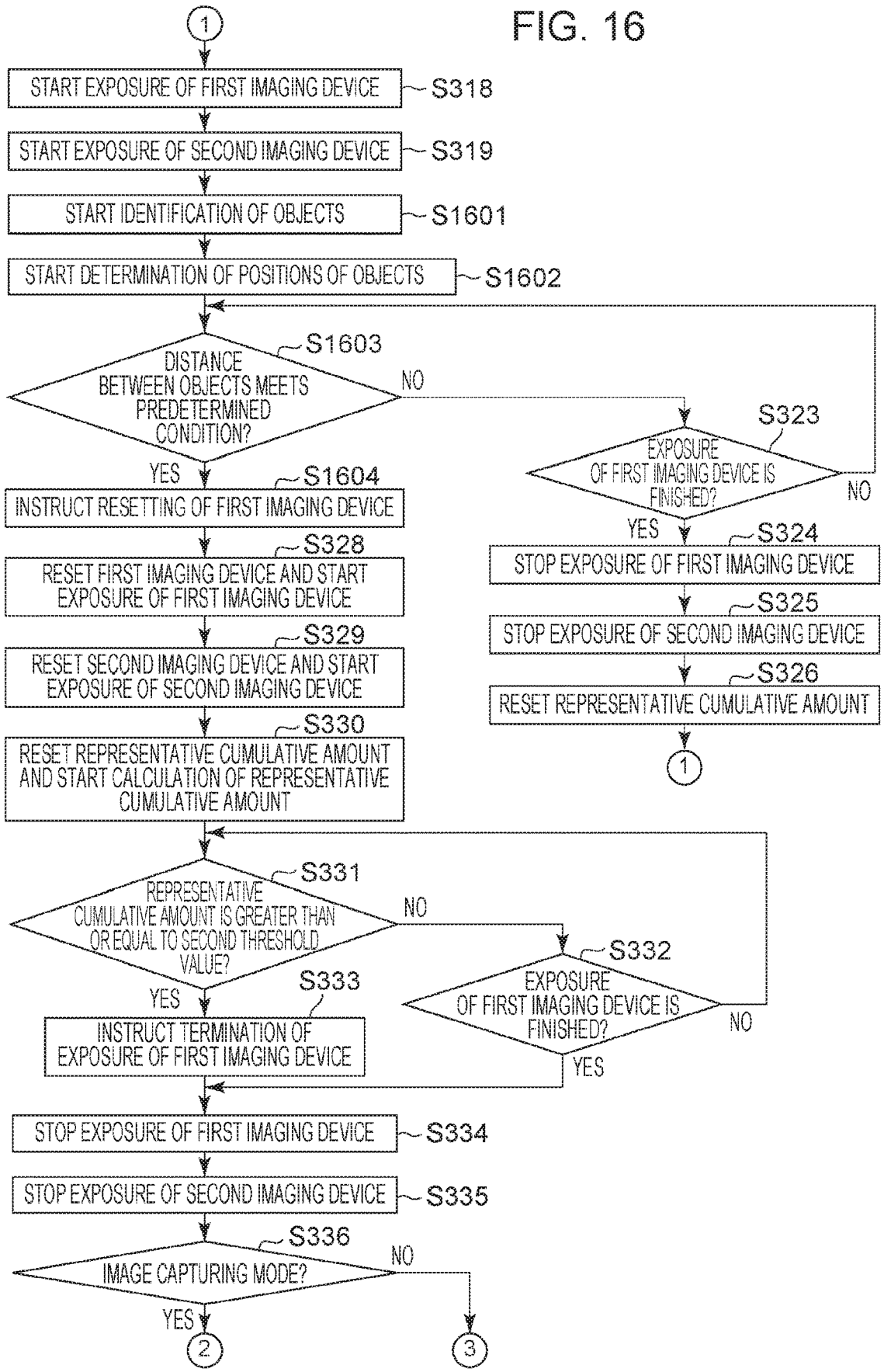
FIG. 16 is the flowchart of an imaging process in the high-speed image capturing mode in the third embodiment of the present invention.

An imaging process in the high-speed image capturing mode in the imaging apparatus 100 of the third embodiment of the present invention will now be described with reference to a flowchart illustrated in FIG. 16. FIG. 16 is the flowchart of the imaging process in the high-speed image capturing mode in the third embodiment. The flowchart illustrated in FIG. 16 differs from the flowchart illustrated in FIG. 4 only in that the flowchart illustrated in FIG. 16 includes Steps S1601 to S1604.

Since Steps S318 and S319, Steps S323 to S326, and Steps S328 to S336 in FIG. 16 are the same as those in FIG. 4, a description of these steps is omitted herein.

Referring to FIG. 16, in Step S1601, the object identification circuit 1501 in the second timing generation circuit 1500 starts identification of certain multiple objects, which have been learned from the image data acquired by the second imaging device 125. The object identification circuit 1501 is composed of, for example, a graphics processing unit (GPU). The object identification circuit 1501 is capable of identifying each of the multiple objects to be learned from the image data by using the learning model 1502 acquired through machine learning for identifying the certain objects in advance.

In Step S1602, the position determination circuit 1503 in the second timing generation circuit 1500 starts determination of whether the positions of the multiple objects, which are identified by the object identification circuit 1501, meets a predetermined condition. In other words, the position determination circuit 1503 determines whether the multiple objects move to the positions meeting a predetermined condition.

In Step S1603, the timing determination circuit 1504 determines whether the positions of the multiple objects meet a predetermined condition. If the positions of the multiple objects do not meet a predetermined condition (NO in Step S1603), the process goes to Step S323. If the positions of the multiple objects meet a predetermined condition (YES in Step S1603), the process goes to Step S1604.

In Step S1604, the timing determination circuit 1504 supplies the signal for instructing the resetting process to the first imaging unit 110. This step is instantly performed after it is determined that the positions of the multiple objects meet a predetermined condition.

For example, a predatory animal, such as a hawk, and a prey animal, such as a mouse or a rabbit, are selected as the multiple objects identified in Step S1601. Then, the distance between the identified multiple objects, which is shorter than or equal to (is close to) a threshold value, is selected as the condition of the positions of the multiple objects in Step S1603. This enables the first imaging device 115 to perform the resetting process immediately before the predatory animal captures the prey animal and to instantly start the exposure. Alternatively, a tennis racket and a tennis ball are selected as the multiple objects identified in Step S1601. Then, the distance between the identified multiple objects, which is shorter than or equal to (is close to) a threshold value, is selected as the condition of the positions of the multiple objects in Step S1603. This enables the first imaging device 115 to perform the resetting process immediately before the tennis ball is hit and to instantly start the exposure. Alternatively, an arm of a javelin thrower and a spear are selected as the multiple objects identified in Step S1601. Then, the distance between the identified multiple objects, which is equal to one meter, is selected as the condition of the positions of the multiple objects in Step S1603. This enables the first imaging device 115 to perform the resetting process immediately after the spear is thrown and to instantly start the exposure. Although the distance between the multiple objects is exemplified as the condition of the positions of the multiple objects here, an area in which the multiple objects are overlapped with each other may be used as the condition.

Step S328 and the subsequent steps are the same as those in the first embodiment. If the timing generation circuit 200 determines that the representative cumulative amount is greater than or equal to the second threshold value, the first control circuit 111 terminates the exposure of the first imaging device 115 even if the exposure time of the first imaging device 115 does not reach an appropriate time.

As described above, in the third embodiment, the exposure of the first imaging device 115 during the exposure is stopped based on the positions of the multiple objects during the exposure period of the first imaging device 115 for the resetting process and the exposure of the first imaging device 115 is instantly restarted. Accordingly, it is possible to capture an image in time with the multiple objects, which have certain composition.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An imaging apparatus comprising:
   a first imaging device;
   a second imaging device; and
   at least one processor or circuit configured to perform the operations of following units:
   a determination unit configured to determine a cumulative amount of motion amounts of an object between frames of multiple pieces of image data, which are captured by the second imaging device; and
   a control unit configured to start exposure for the image data for a first frame by the first imaging device in accordance with a result of comparison between the cumulative amount and a first threshold value,
   wherein the determination unit determines the cumulative amount of the motion amounts of the object while the first imaging device performs the exposure for the image data for a second frame before the first frame, and
   wherein, when the cumulative amount is greater than or equal to the first threshold value, the control unit does not stop the exposure for the image data for the second frame by the first imaging device if the cumulative amount is greater than or equal to a third threshold value higher than the first threshold value and stops the exposure for the image data for the second frame by the first imaging device if the cumulative amount is not greater than or equal to the third threshold value.

2. The imaging apparatus according to claim 1,
   wherein, upon capturing of the image data for a new frame by the second imaging device, the determination unit newly calculates the cumulative amount of the motion amounts of the object between the frames of the multiple pieces of image data that have been captured, and
   wherein, if the cumulative amount is greater than or equal to the first threshold value, the control unit starts the exposure for the image data for the first frame by the first imaging device.

3. The imaging apparatus according to claim 1,
   wherein the determination unit calculates a motion vector as the motion amount of the object.

4. The imaging apparatus according to claim 3,
   wherein the determination unit tracks multiple motion vectors calculated in the multiple pieces of image data to calculate the cumulative amount based on a sum total of lengths of the tracked motion vectors.

5. The imaging apparatus according to claim 3,
   wherein the determination unit calculates reliability of the calculated motion vector and calculates the cumulative amount of the motion vectors resulting from exclusion of the motion vector having a reliability that is lower than a predetermined value, among the multiple motion vectors calculated in the multiple pieces of image data.

6. The imaging apparatus according to claim 1,
   wherein the determination unit includes an identification unit configured to identify multiple objects from the multiple pieces of image data for the multiple frames, which are captured by the second imaging device, and determines a motion of the object based on positions of the multiple objects.

7. The imaging apparatus according to claim 1,
   wherein the first imaging device changes a read-out method of a signal between before the control unit starts the exposure for the image data for the first frame by the first imaging device based on a result of determination by the determination unit and after the control unit starts the exposure for the image data for the first frame by the first imaging device based on a result of determination by the determination unit.

8. The imaging apparatus according to claim 1,
wherein the control unit determines whether the image data for the first frame is to be recorded based on an operation by a user.

9. An imaging apparatus comprising:
a first imaging device;
a second imaging device; and
at least one processor or circuit configured to perform the operations of following units:
a determination unit configured to determine a cumulative amount of motion amounts of an object between frames of multiple pieces of image data, which are captured by the second imaging device; and
a control unit configured to start exposure for the image data for a first frame by the first imaging device in accordance with a result of comparison between the cumulative amount and a first threshold value,
wherein the determination unit determines the cumulative amount of the motion amounts of the object while the first imaging device performs the exposure for the image data for a second frame before the first frame, and
wherein, when the cumulative amount is greater than or equal to the first threshold value, the control unit does not stop the exposure for the image data for the second frame by the first imaging device if an exposure time of the first imaging device is greater than or equal to a fourth threshold value and stops the exposure for the image data for the second frame by the first imaging device if the exposure time of the first imaging device is not greater than or equal to the fourth threshold value.

10. The imaging apparatus according to claim 9,
wherein, upon capturing of the image data for a new frame by the second imaging device, the determination unit newly calculates the cumulative amount of the motion amounts of the object between the frames of the multiple pieces of image data that have been captured, and
wherein, if the cumulative amount is greater than or equal to the first threshold value, the control unit starts the exposure for the image data for the first frame by the first imaging device.

11. The imaging apparatus according to claim 9,
wherein the determination unit calculates a motion vector as the motion amount of the object.

12. The imaging apparatus according to claim 11,
wherein the determination unit tracks multiple motion vectors calculated in the multiple pieces of image data to calculate the cumulative amount based on a sum total of lengths of the tracked motion vectors.

13. The imaging apparatus according to claim 11,
wherein the determination unit calculates reliability of the calculated motion vector and calculates the cumulative amount of the motion vectors resulting from exclusion of the motion vector having a reliability that is lower than a predetermined value, among the multiple motion vectors calculated in the multiple pieces of image data.

14. The imaging apparatus according to claim 9,
wherein the control unit determines whether the image data for the first frame is to be recorded based on an operation by a user.

15. A method of controlling an imaging apparatus, the method comprising:
determining a cumulative amount of motion amounts of an object between frames of multiple pieces of image data using the pieces of image data for the multiple frames, which are captured by a second imaging device; and
starting exposure for the image data for a first frame by a first imaging device in accordance with a result of comparison between the cumulative amount and a first threshold value,
wherein the determining determines the cumulative amount of the motion amounts of the object while the first imaging device performs the exposure for the image data for a second frame before the first frame, and
wherein, when the cumulative amount is greater than or equal to the first threshold value, the controlling does not stop the exposure for the image data for the second frame by the first imaging device if the cumulative amount is greater than or equal to a third threshold value higher than the first threshold value and stops the exposure for the image data for the second frame by the first imaging device if the cumulative amount is not greater than or equal to the third threshold value.

16. A non-transitory computer-readable non-volatile storage medium storing a program executed by a computer in an imaging apparatus, the program causing the computer in the imaging apparatus to perform:
determining a cumulative amount of motion amounts of an object between frames of multiple pieces of image data using the pieces of image data for the multiple frames, which are captured by a second imaging device; and
starting exposure for the image data for a first frame by a first imaging device in accordance with a result of comparison between the cumulative amount and a first threshold value,
wherein the determining determines the cumulative amount of the motion amounts of the object while the first imaging device performs the exposure for the image data for a second frame before the first frame, and
wherein, when the cumulative amount is greater than or equal to the first threshold value, the controlling does not stop the exposure for the image data for the second frame by the first imaging device if the cumulative amount is greater than or equal to a third threshold value higher than the first threshold value and stops the exposure for the image data for the second frame by the first imaging device if the cumulative amount is not greater than or equal to the third threshold value.

17. A method for controlling an imaging apparatus, comprising:
determining a cumulative amount of motion amounts of an object between frames of multiple pieces of image data, which are captured by a second imaging device; and
starting perform exposure for the image data for a first frame by a first imaging device in accordance with a result of comparison between the cumulative amount and a first threshold value,
wherein the determining determines the cumulative amount of the motion amounts of the object while the first imaging device performs the exposure for the image data for a second frame before the first frame, and wherein, when the cumulative amount is greater than or equal to the first threshold value, the controlling does not stop the exposure for the image data for the second frame by the first imaging device if an exposure time of the first imaging device is greater than or equal to a fourth threshold value and stops the exposure for the image data for the second frame by the first imaging device if the exposure time of the first imaging device is not greater than or equal to the fourth threshold value.

18. A non-transitory computer-readable memory storing a program executed by a computer in an imaging apparatus, the program causing the computer in the imaging apparatus to perform:

determining a cumulative amount of motion amounts of an object between frames of multiple pieces of image data, which are captured by a second imaging device; and starting perform exposure for the image data for a first frame by a first imaging device in accordance with a result of comparison between the cumulative amount and a first threshold value, wherein the determining determines the cumulative amount of the motion amounts of the object while the first imaging device performs the exposure for the image data for a second frame before the first frame, and wherein, when the cumulative amount is greater than or equal to the first threshold value, the controlling does not stop the exposure for the image data for the second frame by the first imaging device if an exposure time of the first imaging device is greater than or equal to a fourth threshold value and stops the exposure for the image data for the second frame by the first imaging device if the exposure time of the first imaging device is not greater than or equal to the fourth threshold value.

* * * * *